United States Patent
Liebald et al.

(10) Patent No.: US 12,226,844 B2
(45) Date of Patent: Feb. 18, 2025

(54) METHODS AND DEVICE FOR PRODUCING A THREAD, COMPRISING A GEAR UNIT

(71) Applicant: EMUGE-WERK RICHARD GLIMPEL GMBH & CO. KG FABRIK FUR PRAZISIONSWERKZEUGE, Lauf a.d. Pegnitz (DE)

(72) Inventors: Peter Liebald, Hilpolstein (DE); Dietmar Hechtle, Pegnitz (DE); Thomas Funk, Pegnitz (DE)

(73) Assignee: EMUGE-WERK RICHARD GLIMPEL GMBH & CO. KG FABRIK FUR PRAZISIONSWERKZEUGE, Lauf a.d. Pegnitz (DE)

( * ) Notice: Subject to any disclaimer, the term of this patent is extended or adjusted under 35 U.S.C. 154(b) by 395 days.

(21) Appl. No.: 17/642,574

(22) PCT Filed: Sep. 11, 2020

(86) PCT No.: PCT/EP2020/075523
§ 371 (c)(1),
(2) Date: Mar. 11, 2022

(87) PCT Pub. No.: WO2021/048389
PCT Pub. Date: Mar. 18, 2021

(65) Prior Publication Data
US 2022/0324044 A1    Oct. 13, 2022

(30) Foreign Application Priority Data
Sep. 13, 2019 (DE) .................. 102019124707.1

(51) Int. Cl.
*B23G 5/20* (2006.01)
*B23G 1/16* (2006.01)

(52) U.S. Cl.
CPC ................. *B23G 5/20* (2013.01); *B23G 1/16* (2013.01); *B23G 2240/36* (2013.01); *Y10T 408/03* (2015.01); *Y10T 408/9048* (2015.01)

(58) Field of Classification Search
CPC ...... B23G 5/20; B23G 7/02; B23G 2200/142; B23G 2200/143; B23G 2240/36;
(Continued)

(56) References Cited

U.S. PATENT DOCUMENTS

| 4,985,841 A * | 1/1991 | Iwagaya | G05B 19/186 408/11 |
| 6,111,382 A * | 8/2000 | Tsutsui | G05B 19/186 470/96 |

(Continued)

FOREIGN PATENT DOCUMENTS

| CN | 101896306 A | 11/2010 |
| CN | 106808032 A | 6/2017 |

(Continued)

OTHER PUBLICATIONS

Office Action received for Chinese Patent Application No. 202080079280.3, mailed on Jan. 29, 2024, 17 pages (6 pages of English Translation and 11 pages of Original Document).
(Continued)

*Primary Examiner* — Eric A. Gates
*Assistant Examiner* — Michael Vitale
(74) *Attorney, Agent, or Firm* — Workman Nydegger

(57) ABSTRACT

The invention relates to methods for producing a thread with a predetermined thread pitch in a workpiece.

20 Claims, 13 Drawing Sheets

(58) Field of Classification Search
CPC ........ B23B 2251/082; Y10T 408/9048; G05B 19/186; G05B 2219/45216; G05B 2219/50225
See application file for complete search history.

(56) References Cited

U.S. PATENT DOCUMENTS

| | | | |
|---|---|---|---|
| 10,359,761 B2 * | 7/2019 | Tajima | ................ G05B 19/416 |
| 10,955,813 B2 * | 3/2021 | Tajima | ............... G05B 19/4166 |
| 2001/0015116 A1 | 8/2001 | Kakino et al. | |
| 2010/0260566 A1 | 10/2010 | Glimpel et al. | |
| 2016/0291580 A1 * | 10/2016 | Morita | ................ G05B 19/416 |
| 2016/0357171 A1 * | 12/2016 | Morita | .................. B23Q 15/08 |
| 2017/0028490 A1 * | 2/2017 | Morita | ................ G05B 19/416 |
| 2017/0277160 A1 * | 9/2017 | Morita | .................. G05B 19/29 |
| 2019/0176255 A1 | 6/2019 | Kopton | |
| 2019/0337060 A1 | 11/2019 | Kopton | |
| 2020/0398356 A1 * | 12/2020 | Glimpel | ................... B23G 5/06 |
| 2021/0016376 A1 * | 1/2021 | Kopton | ................... B23G 3/08 |
| 2022/0331894 A1 * | 10/2022 | Beer | .................... B23B 51/102 |

FOREIGN PATENT DOCUMENTS

| | | | | |
|---|---|---|---|---|
| CN | 109475956 A | 3/2019 | | |
| CN | 109562471 A | 4/2019 | | |
| DE | 1818609 | 9/1960 | | |
| DE | 1602863 | 3/1971 | | |
| DE | 2323316 | 11/1974 | | |
| DE | 3241382 | 6/1983 | | |
| DE | 19905775 | 8/2000 | | |
| DE | 102005022503 | 3/2006 | | |
| DE | 102016008478 | 1/2018 | | |
| DE | 102018206545 A1 * | 10/2019 | ............... | B23G 3/08 |
| DE | 102020108679 A1 * | 9/2021 | ............... | B23G 5/20 |
| EP | 1122014 | 8/2001 | | |
| EP | 2361712 | 8/2011 | | |
| JP | S60-146649 | 8/1985 | | |

OTHER PUBLICATIONS

International Search Report and Written Opinion for PCT/EP2020/075523 mailed Dec. 16, 2020.

International Preliminary Report on Patentability received for PCT Patent Application No. PCT/EP2020/075523, mailed on Mar. 24, 2022, 24 pages (11 pages of English Translation and 13 pages of Original Document).

* cited by examiner

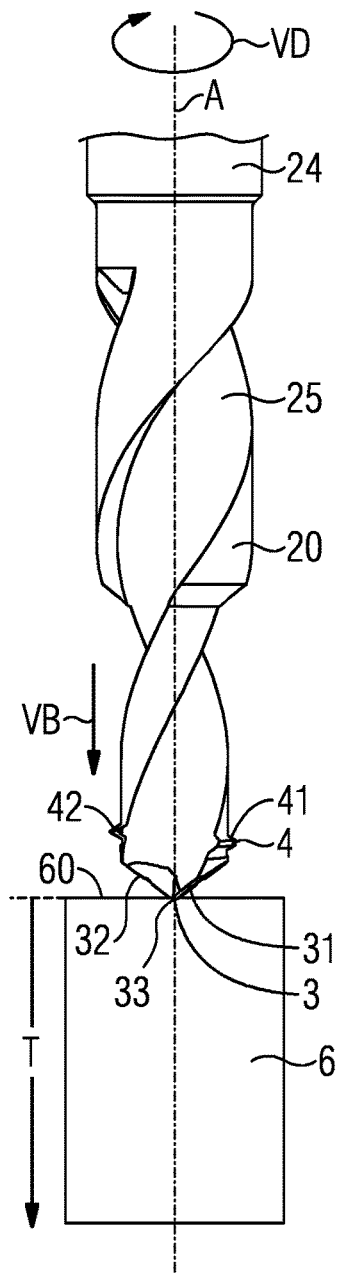
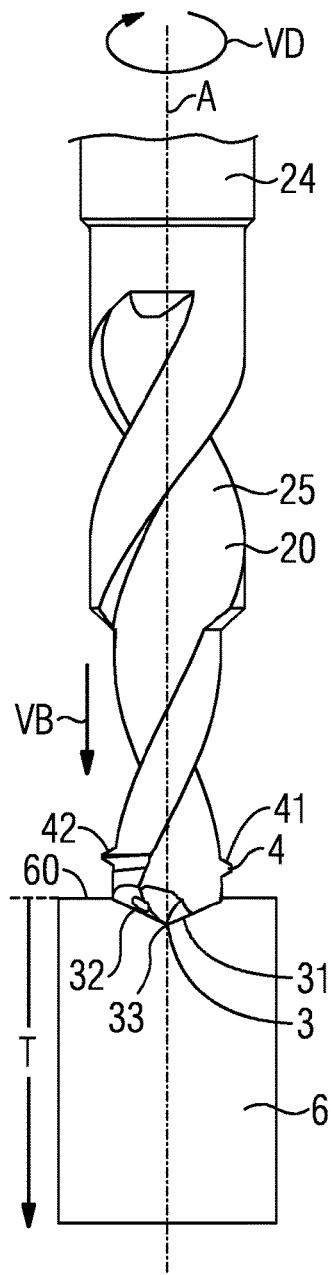
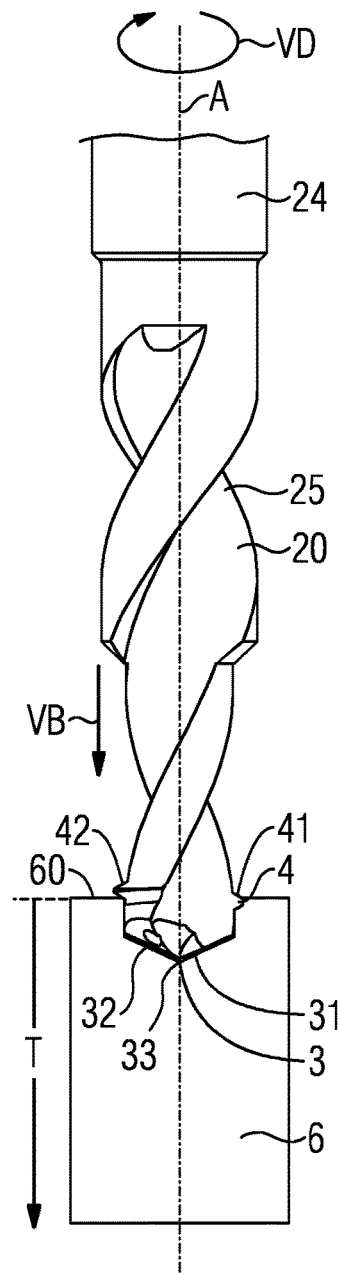

FIG 7
FIG 8
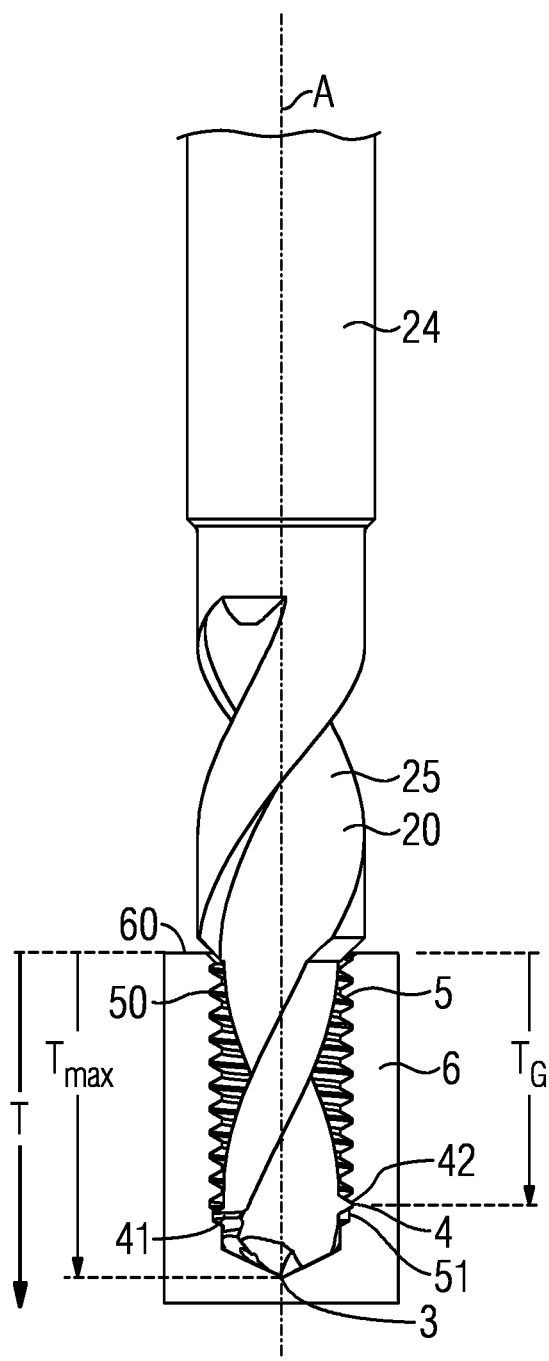
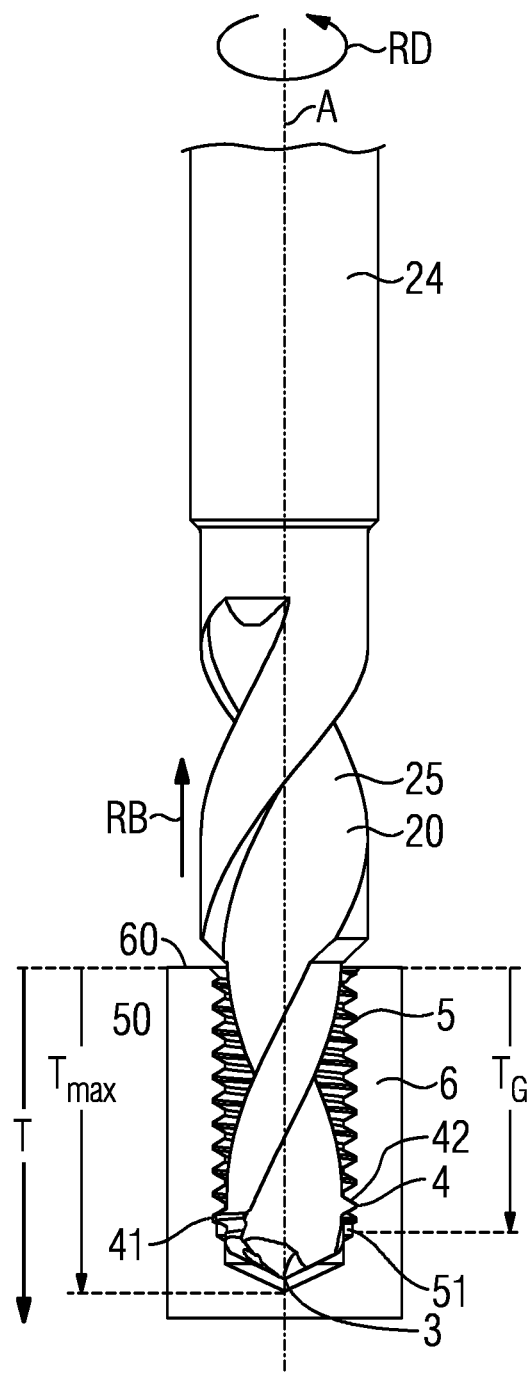

METHODS AND DEVICE FOR PRODUCING A THREAD, COMPRISING A GEAR UNIT

CROSS-REFERENCE TO RELATED APPLICATIONS

The present application is a 35 U.S.C. § 371 U.S. National Stage of PCT Application No. PCT/EP2020/075523 filed on Sep. 11, 2020, which claims the benefit of and priority to German Patent Application No. DE 10 2019 124 707.1. filed Sep. 13, 2019. The entire content of each of the aforementioned patent applications is incorporated herein by reference.

BACKGROUND OF THE INVENTION

1. Field of the Invention

The invention relates to a method for producing a thread and to a device for performing the method.

A thread has helical thread turns with a constant thread pitch and can be produced as an internal thread or as an external thread. In order to produce an internal thread, a core hole (or core bore), which can be a blind hole or a through hole, is usually first produced in the workpiece and then the thread turns are produced in the inner wall of the core hole. The core hole with the thread produced therein is also referred to as a tapped hole.

2. Description of Related Art

A summary of threading tools and working methods that are used is provided in the *Handbuch der Gewindetechnik und Frästechnik* [*Handbook of Thread and Milling Technology*], by EMUGE-FRANKEN, published by Publicis Corporate Publishing in 2004 (ISBN 3-89578-232-7), referred to below simply as "EMUGE Handbook". The principles of programming CNC machines with respect to producing threads are stated in EMUGE Handbook, Chapter 8, page 281, and Chapter 10, pages 357 to 359. Both material-removal and non-cutting methods and tapping tools are known for producing threads. Material-removal thread production consists of removing material of the workpiece in the region of the thread turns. Non-cutting thread production consists of deforming the workpiece and producing the thread turns in the workpiece using pressure.

Material-removal or cutting thread production includes axially operating taps (cf EMUGE Handbook, Chapter 8, pages 181 to 298) and circularly operating thread milling cutters (cf EMUGE Handbook, Chapter 10, pages 325 to 372). Axially operating cold-forming taps (cf EMUGE Handbook, Chapter 9, pages 299 to 324) and also circularly operating circular thread formers are examples of non-cutting threading tools.

Combination tools are now also known by means of which, using the same tool, a tapped hole is produced in a single working step in the solid material of the workpiece, i.e. with no pre-drilling of a core hole. These combination tools comprise a drilling region, which produces the core hole, at the front end and an axially adjoining threading region for producing the thread in the core hole produced by the drilling region, and are also referred to below as combined drilling and threading tools. Such combination tools are known, for example, from the documents DE 1 818 609 U1, DE 2 323 316 A1, DE 32 41 382 A1, DE 10 2005 022 503 A1, and DE 10 2016 008 478 A1.

Different combinations of a simultaneously operating drilling region and threading region in a combination tool for producing a tapped hole are known, inter alia also the combination of an axially operating drilling region and an axially operating cold-forming tapping region in one tool.

A combination tool which is referred to as a one-shot tapping tool and by means of which the drilling of the core hole and the cutting of the internal thread are performed in a common tool stroke is known from DE 10 2016 008 478 A1. A tapping stroke takes place and then a reversing stroke in the opposite direction. In the tapping stroke, on the one hand a main cutter produces the drilled core hole and, on the other hand, a tapping profile produces the internal thread on the inner wall of the drilled core hole until a usable target thread depth is obtained. The tapping stroke is performed with a tapping feed at a rotational speed of the tapping tool synchronized therewith. In a subsequent reversing stroke in the opposite direction, the tapping tool is extracted from the tapped bore in a reversing direction, and to be precise with an opposite reversing feed and a reversing rotational speed synchronized therewith. It is consequently ensured that the tapping profile of the tapping tool is moved in the thread turns of the internal thread in a stress-free manner. The reversing stroke does not take place immediately after the tapping stroke and instead there is first a groove-forming step or groove-forming stroke in which a circumferential groove, with no thread pitch, is formed adjacent to the internal thread and in which the tapping profile of the tapping tool can rotate in a stress-free manner. The tapping tool is moved beyond the target thread depth for the tapping stroke until a target bore depth is reached, and to be precise with a groove-forming feed and a groove-forming rotational speed which are not synchronized with each other and differ from the tapping feed and the tapping rotational speed. In this way, the tapping rotational speed could be reduced to 0 without tool failure or fracturing of the tapping profile occurring owing to excessively high stress on the cutters. The circumferential groove is produced during the groove-forming stroke with the aid of the main cutter and the thread cutting tooth of the tapping profile on the tapping tool. When the target bore depth is reached, the groove-forming feed is reduced to 0. At the same time, the groove-forming rotational speed is also reduced to 0 in order to enable the reversal of the direction of rotation required for the reversing stroke. When the reversing stroke starts, the known tapping tool is activated such that the thread cutting tooth can be moved in a stress-free manner into the exit of the thread turns which opens into the circumferential groove. However, DE 10 2016 008 478 A1 does not disclose how this should happen. The tapping tool is then extracted from the tapped bore in a reversing direction in the opposite direction to the tapping direction, and to be precise with a reversing feed and a reversing rotational speed synchronized therewith, as a result of which the thread cutting tooth can be extracted from the tapped bore with no removal of material.

EP 2 361 712 A2 discloses a method for producing a thread with a threading tool on a numerically controlled machine tool and a corresponding coupling device for an in particular numerically controlled machine tool, wherein the threading tool is rotated by a tool spindle and at the same time advanced in an axial direction according to the thread pitch in order to produce a thread in a bore of a workpiece. In order to increase the speed at which the thread is produced, the invention provides that the rotational speed of the threading tool is multiplied relative to the rotational speed of the tool spindle by means of a transmission gear arranged actively between the tool spindle and the threading tool. It is consequently possible to obtain shorter threading cycles for a given performance of the machine control system with regard to its capacity for synchronization. The method can thus also be made more economic as nothing can be changed without incurring high costs at the synchronization limit of the respective machine tools that are being used. The tool is clamped in a collet and the collet is held in a collet holder which is mounted so that it can rotate relative to the housing of the transmission gear via ball bearings. The machine spindle is mounted so that it can rotate relative to the housing via needle bearings and is connected inside the housing to an inner ring on the periphery of which three gear wheels are arranged via bearing bolts. The three gear wheels engage on the inside in an inner gear wheel which is coupled non-rotatably to the collet holder. The three gear wheels engage on the outside in a gear rim on the inside of an outer ring which is connected to the housing and hence cannot rotate. The inner ring is mounted on its outside via bearings rotatably inside the outer ring, and on its inside is mounted via corresponding bearings on the outside of the end region of the collet holder so that it can rotate relative to the latter. The gear wheels and the gear rim form the transmission gear and their toothings define the transmission ratio of the gear.

A coupling device constructed in this way is manufactured and sold by the Applicant under the name SPEEDSYNCHRO® (see https://speedsynchro.com). The rotational speed of the machine spindle corresponds to the quotient of the rotational speed of the threading tool and the transmission ratio 4.412, and the axial feed to the product of the thread pitch and the transmission ratio 4.412. Also included is axial minimal length compensation, termed Softsyncho® by the Applicant, by means of elastomeric elements in order to compensate the axial forces that occur during the threading process, particularly at the reversal point.

BRIEF SUMMARY OF THE INVENTION

The object of the invention is now to provide a novel method for producing a thread in a workpiece.

In an embodiment according to the invention, a method for producing a thread with a predetermined thread pitch in a workpiece is provided,
- a) in which a tool is used to produce a thread,
- a1) wherein the tool comprises at least one threading region,
- a2) wherein the threading region runs around the tool axis extending through the tool with a predetermined thread pitch and a predetermined handedness of the thread to be produced,
- b) in which the tool is moved into the workpiece in a working movement during a first working phase,
- b1) wherein the working movement comprises a rotational movement with a predetermined direction of rotation about the axis of the tool and an axial feed movement of the tool, in an axial forward direction axially with respect to the tool axis, which is synchronized with the rotational movement in accordance with the thread pitch of the threading region, in such a way that one complete revolution of the tool about the tool axis corresponds to an axial feed of the tool by the predetermined thread pitch,
- b2) wherein the threading region produces thread turns, running at the predetermined thread pitch, in the workpiece during the first working phase,
- c) wherein the tool is moved further into the workpiece as far as a reversal point in a deceleration movement (or circumferential groove-producing movement, undercut movement) during a second working phase following the first working phase,
- c1) wherein the axial feed of the tool, relative to one complete revolution at least during a part of the deceleration movement and preferably during the whole deceleration movement, is smaller in amount than the thread pitch and is zero at the reversal point, and
- c2) wherein the threading region of the tool produces at least one in particular closed or annular peripheral groove in the workpiece during the deceleration movement.

A circumferential or peripheral groove or an undercut is therefore generally produced in the workpiece during the deceleration movement in the second working phase, as a result of which the procedure in the second working phase, apart from a working procedure or movement, can also be termed as the production of a peripheral or circumferential groove or an undercut movement, and in the case of a purely cutting tool can also be termed as a relief-cutting movement. In an embodiment according to the invention, it is now provided that during the working movement, the (actual) rotational speed of the rotational movement of the tool over time extends over a first plateau during which the rotational speed remains constant at a predetermined maximum rotational speed (or one which is programmed or input in the control program), and during the deceleration movement, the (actual) rotational speed of the rotational movement of the tool over time extends over a second plateau during which the rotational speed remains constant at the same predetermined maximum rotational speed, wherein the predetermined maximum rotational speed of the rotational movement of the tool is chosen to be at least large enough that a tool path feed rate at the threading region of at least 57 m/min, in particular at least 85 m/min, is obtained, which for a thread diameter of 6 mm corresponds to a maximum rotational speed of at least 3000 rpm, in particular at least 4500 rpm.

In an embodiment according to the invention, which is preferably combined with the abovementioned embodiments, it is provided that the tool is driven by a machine drive in the working movement and in the deceleration movement and a transmission unit for the rotational movement, in particular a transmission gear unit, with a predetermined or predeterminable transmission ratio is interposed (or coupled) between the machine drive and the tool, wherein the transmission ratio corresponds to the quotient of the rotational speed of the machine drive and the rotational speed of the tool and is a maximum of 1:3 such that the tool rotates at least three times faster than the machine drive, wherein a maximum rotational speed of the rotational movement of the machine drive, which corresponds to the product of the transmission ratio and the predetermined maximum rotational speed of the rotational movement at the tool, is programmed in the program for the machine drive.

Further embodiments and developments according to the invention are the subject of the respective dependent claims.

The claimed combination of features and subjects according to the invention are not limited to the version chosen and the chosen references to the claims. Instead, each feature of a category of claims, for example of a tool, can also be claimed in a different category of claims, for example a method. Moreover, each feature in the claims, also independently of its references, can be claimed in any desired combination with one or more other features in the claims. Furthermore, each feature which is described or disclosed in the description or drawings can be claimed in its own right, independently of or unconnected with the context in which it exists, individually or in any combination with one or more other features which is or are described or disclosed in the claims or in the description or drawings.

In an embodiment, an intermediate time interval in which the rotational speed falls below the maximum rotational speed lies between the time interval of the first plateau of the rotational speed and the time interval of the second plateau of the rotational speed.

In an embodiment, the ratio between the interval length of the intermediate time interval and the interval length of the time interval of the second plateau is situated within a range from 0.5 to 2.4.

In an embodiment, the interval length of the second plateau is chosen to be within a range from 0.01 s to 0.25 s, in particular 0.02 s to 0.13 s and/or in an embodiment the interval length of the intermediate time interval is chosen to be between 0.05 s and 0.15 s, in particular between 0.06 and 0.10 s.

In an embodiment, the maximum rotational speed is already reached at the beginning of the first working phase or of the working movement or at the entry point of the tool into the workpiece.

In an embodiment, the maximum tool path feed rate achieved at the threading region is chosen to be within a range from 57 m/min to 189 m/min, in particular from 85 m/min to 132 m/min.

In an embodiment, the transmission ratio is generally chosen to be between 1:3 and 1:10, in particular between 1:4 and 1:8, preferably between 1:4 and 1:5.

The threading region generally has an active profile which corresponds to the tapping profile of the thread to be produced.

In an embodiment, the threading region has at least one tapping tooth, preferably two tapping teeth, preferably in a front region of the tool.

In an embodiment, a tapping tooth is preferably provided in the front region or as the front tapping tooth and has a tapping tooth profile with a front tapping tooth profile flank and a rear tapping tooth profile flank, and has a front flank relieved surface, immediately adjacent to the front tapping tooth profile flank, on a front tapping tooth flank, and a rear flank relieved surface, immediately adjacent to the rear tapping tooth profile flank, on a rear tapping tooth flank. The front flank relieved surface is set apart or offset backward relative to a front tapping tooth flank envelope which extends along or parallel to the helical line and through the front tapping tooth profile flank. The rear flank relieved surface is then offset or set apart forward with respect to a rear transverse plane which is oriented perpendicular to the tool axis and extends through the rearmost point of the tapping tooth profile or the rear tapping tooth profile flank. The helical line is inclined backward with respect to the rear transverse plane by the thread pitch angle.

Because the tapping tooth is set apart in this way, friction of the tapping tooth on the workpiece surface is prevented or at least significantly reduced both on its front tapping tooth relieved surface and on its rear tapping tooth relieved surface both during the working movement and during the deceleration movement.

"Forward" or "front" should thus be understood here and below as in the direction of forward movement or following the handedness of the threading region, and "backward" and "rear" should be understood as in the opposite direction, i.e. counter to the direction of the forward movement or in the direction of the backward movement or counter to the handedness of the threading region.

In embodiments, the front flank relieved surface is inclined or offset backward with respect to the front tapping tooth flank envelope by a front flank relief angle which is generally situated at an interval between 0° and 10°, in particular between 0° and 2°. In advantageous embodiments, the rear flank relieved surface is inclined or offset backward with respect to the rear transverse plane by an angle which is generally situated at an interval between 0° and 6°, in particular between 2° and 5°, and/or is inclined or offset backward with respect to a rear tapping tooth flank envelope which extends along or parallel to the helical line by a rear flank relief angle which is greater than the thread pitch angle and is generally situated at an interval between the thread pitch angle and 6°, in particular between 4° and 5°.

The flank relieved surfaces can extend helically, i.e. unwinding linearly, or can also assume (differently) curved shapes, can in particular taper at least in places even more pronouncedly toward each other, or also taper toward each other less pronouncedly. In such an embodiment, the corresponding flank relief angle can establish a limit line or surface which is not exceeded (externally) by the flank relieved surface.

In a further embodiment, the threading region has at least one tapping and chip-removal tooth in particular in its rear region or as the rearmost tapping tooth. This tapping and chip-removal tooth has, in a front region viewed in the direction of the handedness, a tapping tooth element with a tapping tooth profile as the active profile for producing or finishing the thread. The tapping and chip-removal tooth moreover has, in a rear region viewed in the direction of the handedness, a chip-removal element for removing chips from the thread produced in a reversing movement, wherein the chip-removal element has a chip-removal profile as an active profile which preferably corresponds to the tapping profile of the thread produced and/or corresponds to the tapping tooth profile at its front region.

The chip-removal element preferably has a chip-removal cutter which has a chip-removal profile which corresponds to the tapping tooth profile of the tapping tooth element, in particular has the same active profile, or at least has the same active profile on chip-removal profile flanks of the chip-removal profile, as the tapping tooth profile. In an advantageous embodiment, the chip-removal element moreover has a furrowing chip-removal face arranged downstream from the chip-removal cutter, viewed in the opposite direction to the handedness, wherein the active profiles of the chip-removal cutter and the chip-removal face are superposed to form the whole chip-removal profile of the chip-removal element. The chip-removal face preferably rises radially outward, viewed in the direction of the handedness, and can merge into a tooth ridge which in particular has a constant profile or no relieved surfaces, wherein in particular a chip-removal profile head of the chip-removal face and/or of the tooth ridge is smaller than a chip-removal profile head of the chip-removal cutter.

The tooth flanks of the tapping and chip-removal tooth can extend at least predominantly or completely along associated front tapping tooth flank envelope or rear tapping tooth flank envelope or with no relieved surfaces.

In a particularly advantageous embodiment of the tool, the threading region has both at least one tapping tooth, as described, and at least one tapping and chip-removal tooth, wherein the tapping and chip-removal tooth is the last tooth of the threading region, viewed in the direction of the handedness, and hence the first tooth in the reversing movement.

In a further embodiment, at least one tapping tooth or the tapping and chip-removal tooth has a thread cutter in its front region, in the direction of the handedness, or in the tapping tooth element and preferably also a thread-forming face, arranged downstream from the thread cutter, viewed in the direction of the handedness, for producing a surface with good surface qualities, wherein the active profiles of the thread cutter and the thread furrowing surface are superposed to form the tapping tooth profile, preferably corresponding to the tapping profile, at the front region.

The thread furrowing surface can rise radially outward in the opposite direction to the handedness and preferably merge into a or into the tooth ridge which serves in particular as a calibrating region and/or has a constant profile or no relieved surfaces. A tapping tooth profile head of the thread furrowing surface and/or the tooth ridge can then be smaller than the tapping tooth profile head of the thread cutter.

In an advantageous embodiment, the tool moreover comprises at least one drilling region for producing a core hole. The drilling region is arranged in a region which is situated further forward, in particular at a front or free end, than the threading region. The drilling region and the threading region are rigidly coupled to each other in terms of movement and/or are fastened or formed on a common tool carrier or tool shank. During the working movement, the drilling region of the tool preferably produces a core hole in the workpiece and the threading region produces thread turns, running with the predetermined thread pitch, in the surface of this core hole. The threading region generally projects radially with respect to the tool axis further outward than the drilling region. As a result, the thread can be produced without any radial advancement of the tool and the drilling region can be extracted again through the core hole during the reversing without damaging the thread.

The deceleration movement preferably comprises a rotational movement with the same direction of rotation as in the working movement.

As a rule, the deceleration procedure or the second working phase begin with an axial feed which corresponds to the thread pitch of the first working phase. The deceleration procedure should be understood as decelerating the initial thread pitch to zero at the end or at a reversal point and must not, over the whole interval of the angle of rotation, include a reduction in the axial feed depending on the angle of rotation (speeding-up of the deceleration), in particular to values below the thread pitch. Instead, intervals of the angle of rotation are also possible in which the axial feed relative to the angle of rotation is zero or even is temporarily negative, i.e. reverses its direction.

In a preferred embodiment, during the deceleration movement the axial feed movement is controlled depending on the angle of rotation of the rotational movement of the tool according to a previously stored injective correlation, in particular a function or a sequence of functions, between the axial feed of the tool and the angle of rotation.

A function which defines the correlation between the axial feed (or the axial penetration depth) and the angle of rotation can have a continuous definition range and value range or also a discrete definition range and value range with discrete previously saved or previously calculated pairs of values or tables of values.

In an embodiment, the rotational speed of the rotational movement is also zero at the reversal point and/or the whole or cumulative axial feed of the tool during the deceleration movement is chosen or set to be between 0.1 and 2 times the thread pitch.

In a preferred embodiment, during the deceleration movement, in a plurality of successive deceleration steps different correlations, in particular functions, between the axial feed of the tool and the angle of rotation are chosen or set.

In a particularly advantageous embodiment, during a plurality and in particular also all of the deceleration steps, a linear function of the angle of rotation is chosen for the axial penetration depth or the axial feed and/or the (programmed) pitch, i.e. the derivative of the axial penetration depth or the axial feed with respect to the angle of rotation, is constant in each of these deceleration steps and decreases in amount from one deceleration step to a subsequent deceleration step.

This embodiment can be implemented particularly simply by an NC command for a threading process, for example a G33 path condition, being used with the thread pitch of the thread and, in the plurality of deceleration steps, an NC command for a threading process, preferably the same command, for example a G33 path condition, likewise being used with the respective constant pitch as a thread pitch parameter.

In an embodiment, during a plurality and in particular all of the deceleration steps, the axial penetration depth or the axial feed is an in particular cubic spline function of the angle of rotation.

In an embodiment, the different functions of successive deceleration steps are continuous and, in the case of differentiable functions, preferably joined together in a continuously differentiable manner.

In an embodiment, in particular during a smoothing step, the axial feed is zero during the acceleration movement in a subinterval of the angle of rotation and/or takes place in a subinterval of the angle of rotation in a backward direction in an opposite direction to the forward direction of the working movement.

In an embodiment, after the reversal point has been reached, a reversing movement of the tool is initiated by means of which the tool is moved out of the workpiece, wherein the reversing movement comprises initially a first reversing phase by means of which the threading region of the tool is guided back into the thread turns of the thread produced, and then a second reversing phase during which the threading region is guided outward through the thread turns out of the workpiece.

The reversing movement is preferably performed with a movement path which is symmetrical with respect to the working movement and the deceleration movement, with an opposite direction of rotation and an opposite feed.

In an advantageous embodiment, the reversing movement in the first reversing phase is controlled with the previously stored injective correlation, of the same amount, but inverted in the direction of rotation and the feed direction, in particular a function or a sequence of functions, between the axial feed of the tool and the angle of rotation, as in the deceleration movement during the second working phase, possibly omitting or shortening the smoothing step, where present.

In an embodiment, during the reversing movement, the tapping and chip-removal tooth of the tool now removes with its chip-removal element foreign bodies, in particular chips or chip roots, from the thread and can in particular also smooth the workpiece surface, in particular inside the thread, and/or in particular not allow any gaps, in which chips could get stuck, from the inner wall of the thread turns to occur during the chip-removal procedure.

BRIEF DESCRIPTION OF THE DRAWINGS

The invention is explained further below with the aid of exemplary embodiments. Reference is here also made to the drawings, in which, in each case schematically:

FIGS. 2 to 10 show successive steps of a method or cycle for producing a tapped hole with a combined drilling and threading tool, in particular according to FIG. 1.

Mutually corresponding parts and sizes are provided with the same reference symbols in FIGS. 1 to 19.

DETAILED DESCRIPTION OF THE INVENTION

First exemplary embodiments of the tool and the method according to the invention are explained below with the aid of FIGS. 1 to 11.

Figure 1:
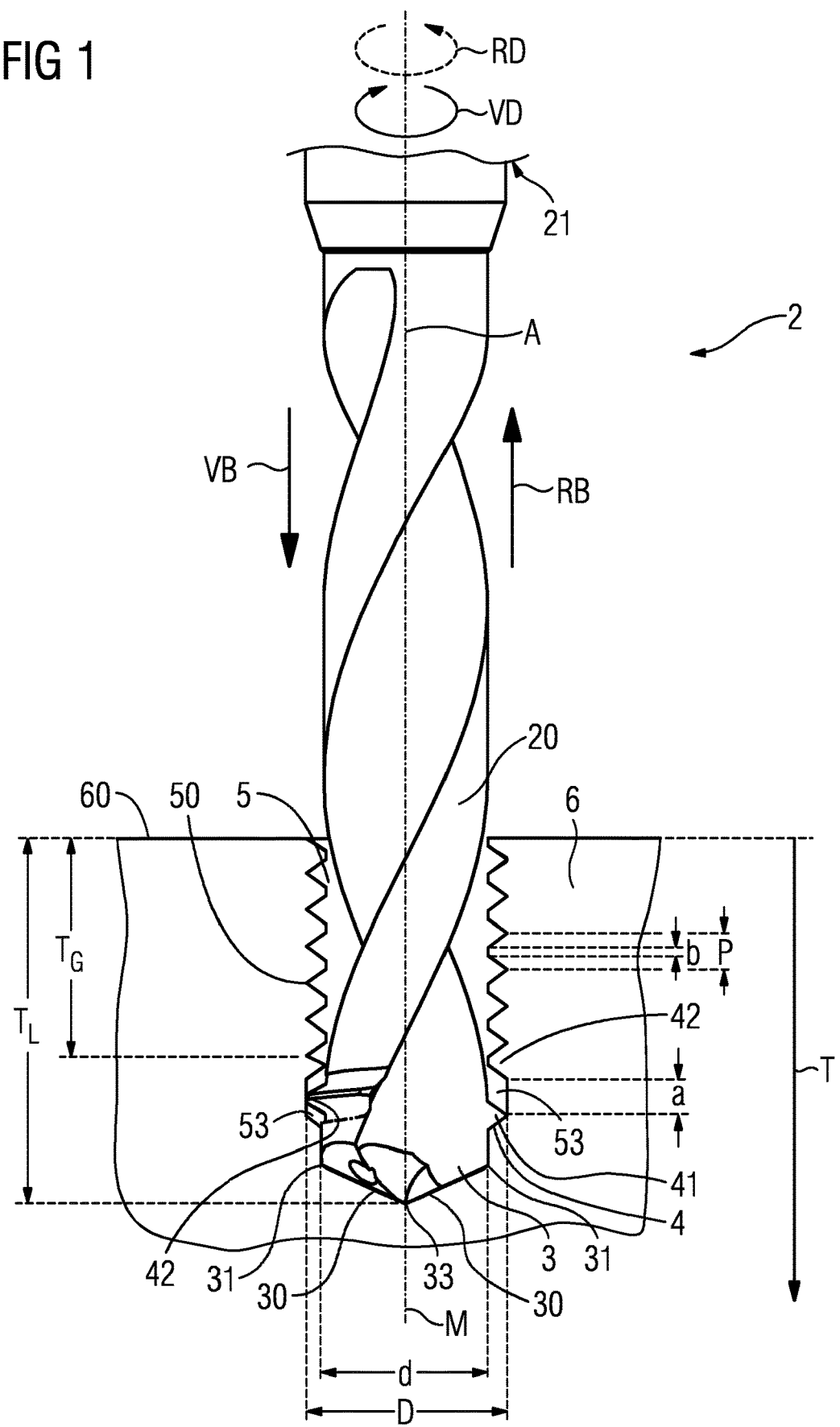
FIG. 1 shows a combined drilling and threading tool during the production of a tapped hole.

The tool 2 shown in FIG. 1 and also in FIGS. 2 to 10 is used to produce a tapped hole 5 in a workpiece 6. The tool 2 is a combined tool and produces both the core hole in the workpiece with the predetermined core hole diameter of the thread and the internal thread in the core hole, i.e. the thread turns 50 of the internal thread in the surrounding wall or inner wall of the core hole. To do this, the tool is moved into the workpiece 6 in a working movement or a working stroke or a threading movement which is composed of a rotational movement about the tool axis, on the one hand, and an axial feed movement along the tool axis.

Figure 11:
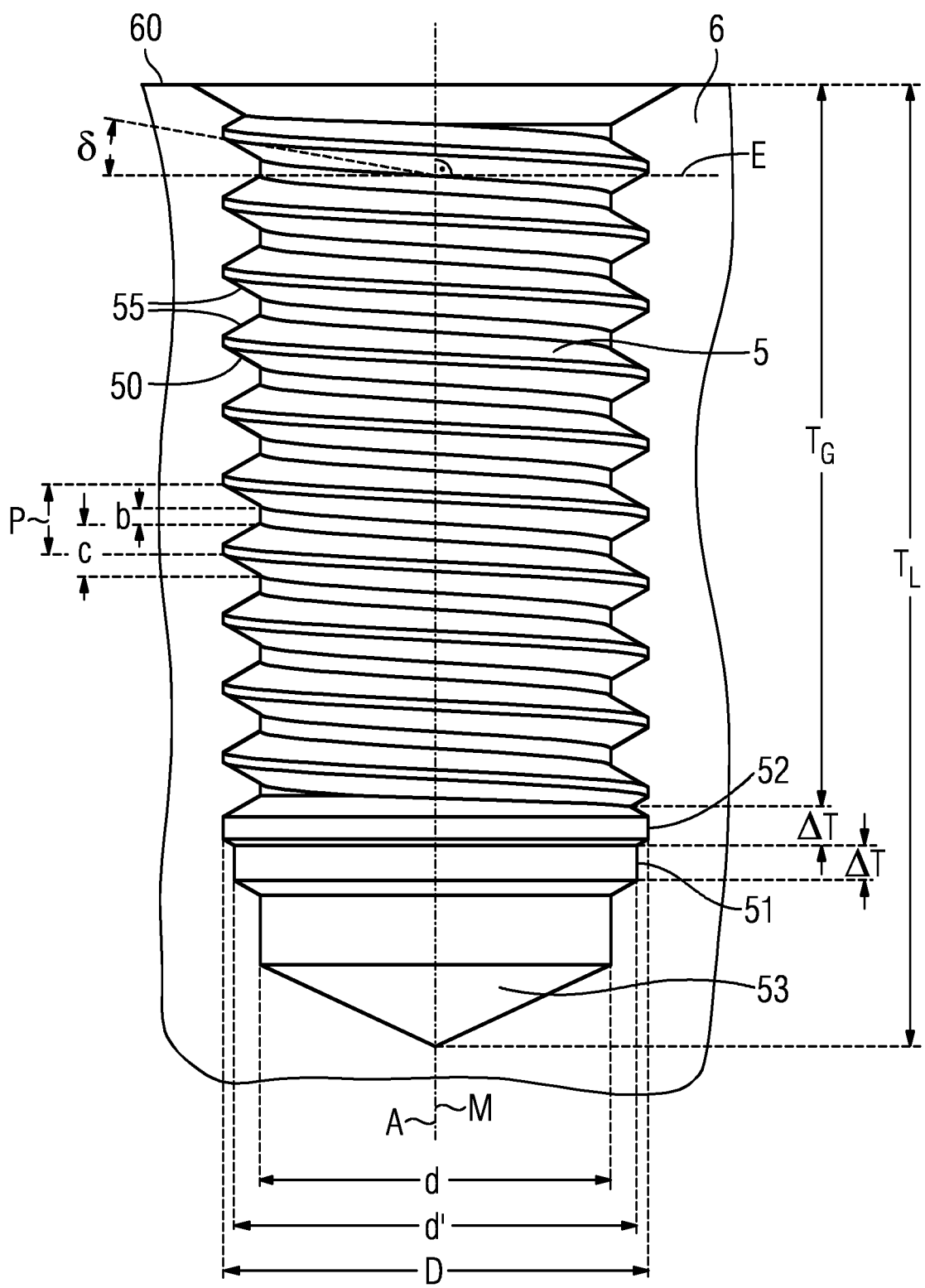
FIG. 11 shows a tapped hole produced with a combined drilling and threading tool, in particular according to FIG. 1, or a method or cycle for producing a tapped hole, in particular a method according to FIGS. 2 to 10.

FIG. 11 shows an exemplary embodiment of a tapped hole 5, with thread turns 50 and a tapping profile 55, which can be created using a method or a tool according to the invention, for example a tool according to FIG. 1.

The thread pitch angle δ of the thread turns 50 with the thread pitch P and the diameter D is measured with respect to a transverse plane E, which is directed perpendicular to the tool axis A, and can be calculated from the following equation:

$$P = \pi \cdot D \tan \delta$$

Typical values for the thread pitch angle δ are situated, for example, between 1° and 5°.

The tool 2 can, on the one hand, be rotated or moved in rotation about a tool axis A extending through the tool 2 and, on the other hand, be moved axially or in translation along or axially with respect to the tool axis A. These two movements are coordinated or synchronized, preferably by a monitoring unit, in particular a machine control system, whilst the tool 2 penetrates the workpiece 6 at a surface 60 of the workpiece 6 as far as a hole depth LT. The tool axis A remains stationary and in a constant position relative to the workpiece 6 during the production of the tapped hole 5. The thread center axis M of the tapped hole 5 is coaxial with the tool axis A or coincides with the latter during the process.

The tool 2 can preferably be driven in rotation or in a rotational movement about its tool axis A in a forward direction of rotation VD and in an opposite backward direction of rotation RD, preferably by means of a coupling region on a tool shank 21 extending or formed axially with respect to the tool axis A by means of a rotary drive (not shown), in particular a machine tool and/or a drive or machine-tool spindle. The tool 2 can moreover be moved axially in an axial forward movement VB or an axial backward movement RB axially with respect to the tool axis A, in particular by means of an axial drive which can in turn be provided in the machine tool and/or the drive or machine-tool spindle.

A working region 20 is provided at a free end region, remote from the coupling region of the shank 21, of the tool 2. The working region 20 comprises a drilling region 3 at the front end of the tool 2 and a threading region 4 offset backward with respect to the drilling region 3 or toward the shank 21, axially with respect to the tool axis A.

The drilling region 3 comprises front (main) drilling cutters 31 and 32 which can be arranged so that they run obliquely, in particular conically, axially forward and can converge in a drill tip 33, in particular in a cone tapering to the drill tip 33. These front drilling cutters 31 and 32 are designed so that they cut in the forward direction of rotation VD, and so that they cut to the right in the exemplary embodiment illustrated, and, during the forward movement VB with simultaneous rotational movement in the forward direction of rotation VD, remove chips of material of the workpiece 6 which lie axially in front of the tool 2.

Furthermore, the drilling region 3 which usually is designed to be relatively short in the axial direction preferably also comprises guide regions (not described in detail) on its outer wall which can serve for independent guidance of the tool 2 in the bore produced and for this purpose bear against the wall of the core hole or are only slightly spaced apart therefrom. Instead of or in addition to the guide regions, peripheral cutters or cylinder-wall cutters can also be provided which machine or prepare the surrounding wall of the core hole by removing material from those regions of the workpiece 6 which are adjacent radially outward with respect to the tool axis A. These cylinder-wall cutters can serve to achieve adequate surface properties of the cylinder wall or core hole inner wall and extend in particular predominantly parallel or slightly inclined backward (to reduce friction) with respect to the tool axis A at a radial spacing d/2 from the tool axis A which corresponds to half the core hole internal diameter. The guide regions 31 or peripheral or cylinder-wall cutters can be formed and/or arranged so that they immediately adjoin the front drilling cutters 31 and 32 or can also be offset slightly axially therefrom.

The drilling region 3 has an external diameter or drilling diameter d and consequently produces a bore or a core hole with this internal diameter d in the workpiece 6. The drilling cutters 31 and 32 can also be referred to as core hole cutters because they produce the core hole of the tapped hole 5. The outermost radial dimensions, with respect to the tool axis A, of the drilling or core hole cutters 31 and 32 here determine the core hole internal diameter d. The threadless lower or innermost bore subregion 56 in the tapped hole 5 according to FIG. 11 also has the form reproduced by the drilling region 3.

Arranged upstream behind the drilling region 3 or the drilling or core hole cutters 31 and 32 or offset axially in the opposite direction to the axial forward movement VB, the tool 2 moreover comprises a threading region 4 which extends or is formed along a helical line (or helix, thread turn), the pitch of which corresponds to the thread pitch P and the handedness of which corresponds to the handedness of the internal thread or thread turns 50 to be produced. The helical line is to be understood as technical in this sense and not as a purely mathematical one-dimensional line and instead also has a certain extent, transverse to the mathematical line, which corresponds to the corresponding dimensions of the threading region 4. In mathematical terms, one should rather speak of a group of helical lines extending parallel to one another, or possibly a helical band. The handedness of the threading region 4 as a right-hand thread or a left-hand thread corresponds to the superposition of the axial forward movement VB and forward rotational movement VD.

The threading region 4 generally projects further outward radially relative to the tool axis A or has a larger radial outer spacing from the tool axis A than the drilling region 3 or has a larger external diameter D than the external diameter d of the drilling region 3.

The threading region 4 comprises one or more, i.e. a number n that is greater than or equal to 1, tapping teeth which are designed to cut and/or form. Preferably, n=2. Each tapping tooth is designed or oriented or arranged so that it extends along the helical line. Each tapping tooth has a tapping tooth profile as an active profile which generally is the result of or is represented by the outermost dimension or outer profile of the tapping tooth in a projection along the helical line and is reproduced in the workpiece during the threading movement, be it by cutting or by forming or by being impressed. If a plurality (n>1) of tapping teeth are included in the threading region 4, these tapping teeth are arranged so that they are offset relative to one another at least approximately along the helical line (or in an axial direction). Encompassed by such an arrangement along the helical line are also embodiments in which tapping teeth are offset slightly laterally with respect to an ideal line, for example in order to obtain active tapping profiles also with a different treatment on the thread flanks or a different distribution or superposition of the active tapping profiles over or in order to form the total tapping profile. The only important thing with regard to this arrangement of the tapping teeth is that their arrangement is reproduced in thread turns in the workpiece with the same thread pitch P during the working movement.

In the exemplary embodiment illustrated in FIG. 1, two tapping teeth 41 and 42 are provided which are, for example, offset axially with respect to each other by half or generally 1/n of the thread pitch P, i.e. are therefore correspondingly offset angularly by half a revolution or by 180°. The tapping teeth, in particular 41 and 42, project radially further outward from the tool axis A than the drilling or core hole cutters 30 and 31. The external diameter of the threading region 4 and the thread turns 50, and hence the tapped hole 5, is designated by D. The radial difference between the outermost dimension of the threading teeth and the outermost radial dimension of the core hole cutters corresponds in particular to the profile depth of the tapping profile of the internal thread to be produced or, in other words, the difference between the radius D/2 of the thread root and the radius of the core hole d/2.

The tapping profile of the internal thread, i.e. the cross-section through the thread turns 50, is produced by the active tapping profile composed of or the result of the superposition of the individual active profiles of the tapping teeth, for example 41 and 42, during a complete passage through the workpiece.

The tapping profile width, measured in an axial projection on the tool axis A, of the active tapping profile is designated c and corresponds to the maximum spacing between the tapping profile flanks. The axial spacing, measured in an axial projection on the tool axis A, between two successive tapping profiles of the thread turns 50 is the thread gap b. The sum of the thread gap b and the thread width c here corresponds to the thread pitch P.

The tapping teeth 41 and 42 are generally separated from each other by separating grooves 25 which in particular form chip grooves or also coolant and/or lubricant grooves. The separating grooves 25 begin in the drilling region 3 and continue, through the threading region 4, in particular as far as the shank region and preferably extend, twisted at a constant or variable twist angle, which is typically situated at an interval of 0° to 50°, in particular 20° to 35°.

In an advantageous embodiment, the following method is performed using the tool 2 or another tool according to the invention:

During a first working phase or threading phase, the core hole is produced by the tool 2 by means of the drilling region 3 and, immediately behind it axially and at least partially simultaneously, the thread turns 50 are produced in the core hole wall by means of the threading region 4. In this first working phase, the axial feed rate v along the tool axis A is coordinated and synchronized with the rotational speed for the rotational movement about the tool axis A such that, in one complete revolution, the axial feed corresponds to the thread pitch P. The axial penetration depth (or the axial feed) T, measured in the direction of the tool axis A from the workpiece surface 60, corresponds in this first working phase to the thread depth $T_G$. The variable T corresponds to the z-axis in a customary NC machine control system.

Then, in a second working phase immediately succeeding the first working phase, in a deceleration procedure (or in a deceleration movement) the workpiece 2 is decelerated in an interval of the angle of rotation such that, in the case of an angle of rotation of 360°, i.e. in the case of one complete revolution, of the tool 2, the axial feed V is less than the thread pitch P and decreases to zero. The deceleration procedure or the second working phase usually begins with an axial feed relating to an angle of rotation of 360° which corresponds to the thread pitch P of the first working phase, i.e. V=P, and then reduces the axial feed per 360° angle of rotation to values below the thread pitch P, i.e. V<P. The deceleration procedure is to be understood as deceleration of the initial thread pitch V=P to zero at the end or at a reversal point, i.e. V=0, and must not include a reduction in the axial feed V depending on the angle of rotation over the whole interval of the angle of rotation (speeding-up of the deceleration). Instead, intervals of the angle of rotation are also possible in which the axial feed relative to the angle of rotation is zero or even is temporarily negative, i.e. reverses its direction. In a preferred embodiment, this deceleration procedure takes place in defined substeps, as will be described in greater detail below.

This deceleration movement in the second working phase causes the threading region 4, in an actually atypical or non-functional manner, then to produce at least one circumferential groove or peripheral groove (or an undercut) in the core hole wall. The procedure in the second working phase can therefore be described, other than as a deceleration procedure, also as the production of a peripheral groove or the production of a circumferential groove or an undercut movement, or also as a relief-cutting movement in the case of a purely cutting tool.

The threading teeth 41 and 42 with the same external radius D/2 and preferably the same active tapping profile which already corresponds to the final profile of the thread turns 50 are illustrated in FIG. 1. The threading teeth 41 and 42 of the tool according to FIG. 1 produce in the second working phase a peripheral groove 53 with the continuous external diameter D and the axial length a which result from the total axial feed of the deceleration movement in the second working phase as far as the reversal point.

In contrast, two peripheral grooves 51 and 52 are illustrated in FIG. 11, wherein the first peripheral groove 51 has an external diameter d' situated between the core hole diameter d and the thread external diameter D, and the second peripheral groove 52 has an external diameter which corresponds to the thread external diameter D.

Such peripheral grooves 51 and 52 can be produced during the second working phase, for example with two threading teeth 41 and 42 offset by P/2 and as illustrated for example in FIG. 1, which are modified as follows: the first threading tooth 41 in FIG. 1 can have just an external radius d'/2 and hence be an initial cutting or initial furrowing tooth which does not produce the thread turns 50 as far as the full profile depth or as far as the final thread root, whilst the second threading tooth 42 has the full external diameter D, i.e. produces the full tapping profile depth (full tooth).

In this exemplary embodiment, the peripheral groove is thus composed of two subgrooves, namely the first peripheral groove 51, with a smaller diameter, which is produced by the first threading tooth 41, and the second peripheral groove 52, formed with the full diameter D, which is produced by the second threading tooth 42.

These embodiments are only given by way of example. In the case of a different number or distribution (not illustrated) of threading teeth, different peripheral grooves result accordingly.

If it is desired to produce the peripheral groove or grooves, for example the peripheral grooves 51 and 52 in FIG. 11 or the peripheral groove 53 in FIG. 1, as continuous or uninterrupted in the axial direction, the axial feed V is reduced in the case of a full revolution or 360° in particular by at least b/n with respect to P in order to close or no longer produce the thread gap b, wherein n is the number of threading teeth in the threading region 4.

The undercut movement or deceleration movement can also be performed, for example by an appropriate choice of the movement parameters or also by additional axial smoothing movements, such that the external width at the tapping profile, in particular the flanks, can no longer be seen or disappear in the peripheral groove and/or the peripheral groove only has a cylindrical form. The screwability of the workpiece thread produced could thus be improved or facilitated.

In the exemplary embodiments illustrated in FIGS. 1 to 11, n=2 with the two threading teeth 41 and 42 or circumferential grooves 51 and 52 such that the axial feed V is therefore preferably set to be smaller than P−b/2 in the deceleration procedure. The active tapping profile of the threading teeth, here 41 and 42, then no longer produces a thread when superposed during the movement and instead at least one continuous peripheral groove which has throughout the external diameter which corresponds to that of the associated threading tooth on its respective travel during the deceleration movement in the second working phase.

By virtue of the drilling region 3 of the tool 2, there exists at the front a bore subregion 56 at the bottom of the tapped hole 5 on which the form of the drilling region 3 is reproduced during drilling. The total depth or hole depth or the total axial dimension of the tapped hole 5 is designated $T_L$ after the second working phase and corresponds essentially to the sum of the thread depth $T_G$ as the axial feed in the first working phase and the axial groove length a as the axial feed in the second working phase and the axial depth of the remaining bore subregion 56 produced by the drilling region 3.

If the total depth or hole depth $T_L$ of the tapped hole 5 is reached, the tool 2 comes to a halt and reaches a reversal point UP. A reversing or backward movement RB is then initiated immediately at the reversal point RB, by means of which the tool 2 is first moved back in a first reversing phase through the circumferential groove or grooves 51, 52, 53 as far as the thread turns 50 and is then, in a second reversing phase, is moved or unscrewed through the thread or the thread turns 50 outward, out of the tapped hole 5 and then out of the workpiece 6. Because of the smaller diameter, the thread is also not damaged by the drilling region 3 during the reversing movement. Further details of a preferred design of the first reversing phase will be given below.

In the second reversing phase of the backward movement RB, the axial feed and the rotational movement of the tool 2 are again synchronized with each other according to the thread pitch P in order not to damage the thread only by in each case switching or opposing the direction of the axial feed in the direction of the arrow of the backward movement RB with the direction of the arrow of the forward or working movement VB, and the direction of rotation of the rotational movement is likewise reversed, i.e. the backward direction of rotation VR is then set instead of the forward direction of rotation VD.

The thread axis or center axis of the thread with the thread turns 50 is designated M and, during the whole working movement, i.e. both in the first working phase and in the second working phase, and also during the reversing movement, i.e. both in the first reversing phase and in the second reversing phase, coincides with the tool axis A of the tool 2 or is coaxial therewith.

Figure 12:
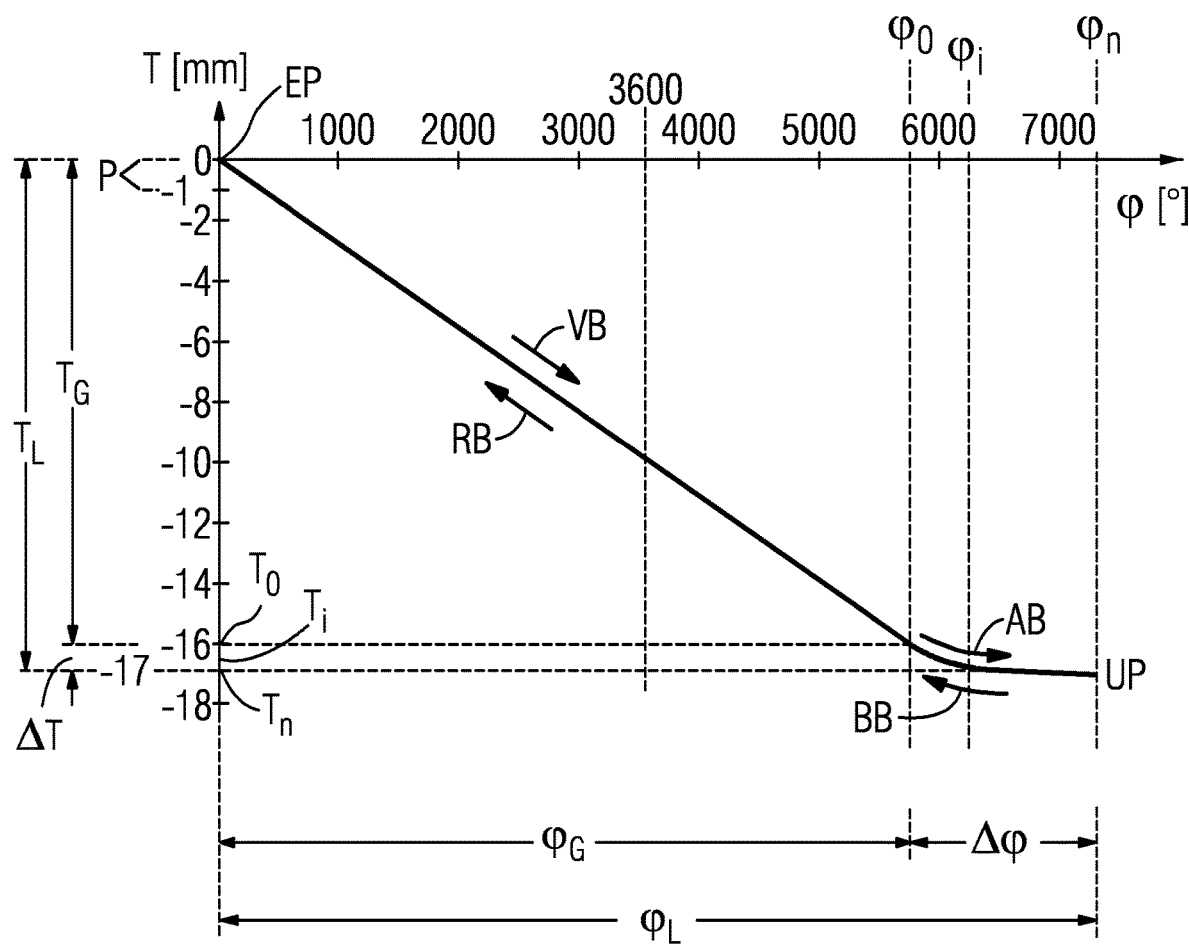
FIG. 12 shows the controlling of a tapped hole production cycle with the aid of a graph of the axial penetration depth as a function of the angle of rotation.

FIG. 12 shows with the aid of a diagram an exemplary embodiment of a process (or method) of a control sequence which can be used to produce a tapped hole in the workpiece, i.e. in the solid material of the workpiece with no prior drilling of a core hole, for example a tapped hole according to FIG. 11.

In order to produce the tapped hole according to the invention, apart from a tool according to the invention, for example according to FIG. 1, a combined drilling and tapping tool known per se and as known from the document DE 10 2016 008 478 A1 mentioned at the beginning, or a combined drilling and cold-forming tapping tool as known from the document DE 10 2005 022 503 A1 mentioned at the beginning, can also be used.

In the graph of the function T ($\varphi$) according to FIG. 12, with no limitation of the general nature of the invention, in particular the production of a tapped hole, i.e. a complete tapped hole production cycle according to the invention, is illustrated in an exemplary embodiment, in particular a tapped hole production cycle with a first working phase, a second working phase, a reversal point, a first reversing phase, and a second reversing phase, for example as already described with the aid of FIGS. 1 to 10.

In the diagram in FIG. 12, plotted in mm on the vertical axis or y-axis is the penetration depth (or vertical or axial coordinates) T as coordinates for the axial feed which extend and are measured in the axial direction, i.e. along the tool axis A and the thread center axis M coaxial with the tool axis A. The values for the penetration depth T decrease from the value mentioned above which in particular corresponds to the axial entry position on the workpiece surface 60 of the workpiece 6 (which is also illustrated in FIG. 2) down to a lowest value and are therefore plotted as negative values. In the example in FIG. 1, the numerical range is by way of example from T=0 mm as the highest value to, for example, T=−17 mm as the lowest value but of course other values are also possible depending on the desired thread length and the design of the tool.

The (totaled) angle of rotation $\varphi$ of the rotational movement of the tool 2 about its tool axis A is plotted in degrees [°] on the horizontal axis or x-axis. The angle of rotation $\varphi$ starts from the entry angle of rotation or initial angle of rotation $\varphi=0°$ at the axial entry position T=0 mm at an entry point EP=(0, 0) and increases to the right to positive values as far as the value $\varphi=8000°$ entered as the last value on the x-axis. During the forward rotational movement VB or in a forward direction of rotation, the angle of rotation $\varphi$ increases into positive values and decreases during the backward rotational movement RD or a backward direction of rotation in the opposite direction to the forward direction of rotation. Here, ±360° corresponds to one complete revolution of the tool 2 about its tool axis A.

The function T($\varphi$) describes the dependency or synchronization of the axial feed movement in the axial coordinate (or depth in the workpiece 6) T on or with the rotational movement in the coordinate $\varphi$ and is typically saved in a control system such as a numerical control system or NC control system of the machine tool, in particular in the form of a previously calculated and stored value table or also as a function for the respective calculation. According to the nomenclature which is conventional in CNC technology, the T coordinate corresponds to the z-axis (spindle axis), wherein the positive direction conventionally runs from the workpiece to the tool, as indicated for example in FIG. 1 with the coordinate T.

The graph ($\varphi$; T($\varphi$)) of the function T($\varphi$) first runs according to FIG. 12 in a linear section which is typical for a tap or cold-forming tap and corresponds to the production of the thread turns, i.e. in the form of a straight line, from the starting point $\varphi=0°$ and T=0 mm as far as a thread end point at $\varphi_0$ and T($\varphi_0$) at which the thread turns or the actual threading end or ends and which in the example shown is −16 mm, with no limitation of the general nature of the invention.

The linear function T($\varphi$) in this section from $\varphi=0$ to $\varphi=\varphi_0$ and T=T (0), in particular 0 mm, to T=T($\varphi_0$), in particular −16 mm can therefore be represented as:

$$\|T(\varphi)\|=(P/360°)\varphi$$

with the thread pitch P.

The pitch or derivative $dT/d\varphi$ in this range is constant and corresponds to the value according to $P/360°$. This therefore means for the thread pitch that $$P=360°\|dT/d\varphi\|$$

Because, in the example chosen in FIG. 12, the value, corresponding to the plotted angular value $\varphi=3600°$, for the thread depth is T=−10 mm, the slope of the straight line is −1 mm/360° and hence the thread pitch is P=1 mm. By virtue of the axial feed, synchronized with the rotation, along the penetration depth T or thread center axis M, in the case of one complete revolution by 360°, all the components of the tool 2 are moved by the thread pitch P.

The linear section of the function T($\varphi$) corresponds to the usual synchronized tap or cold-forming tap kinematics and can be saved in a CNC control system, for example as a pre-programmed path condition (address letter G or G function), for example as G33, in particular G331 and G332, wherein the thread pitch P is input as an interpolation parameter parallel to the z-axis, typically with the address letter K in CNC nomenclature. The threading process takes place in this linear section, in particular in order to produce the thread turns 50 in the first working phase, different positions or sections thereof with an increasing penetration depth T being shown in particular in FIGS. 3 to 6, and as a result a thread of thread depth TG is produced as the interval length of the penetration depth T, in particular from T=0 to $T_0$, over the interval length or the range (PG of the angle of rotation $\varphi$, in particular from $\varphi=0°$ to $\varphi=\varphi_0$. In the example in FIG. 12, the threading process (first working phase) takes place from $\varphi=0°$ to $\varphi=\varphi_0$ and from the corresponding penetration depth T=0 mm to T=−16 mm. The slope of the straight line in FIG. 12 between $\varphi=0$ and $\varphi=\varphi_0$ corresponds to the axial feed rate of the tool 2 which is synchronized with the angle of rotation $\varphi$ according to the thread pitch P.

The temporal dependence of the angle of rotation $\varphi(t)$ as a function of time t and hence the penetration depth T(t) as a function of time t can in principle be varied during the threading process, and within wide ranges too. However, the rotational speed $d\varphi/dt$ and the axial feed rate dT/dt are preferably in each case constant during the working movement VB. If the rotational speed $d\varphi/dt$ is changed, the axial feed rate dT/dt, i.e. the derivative of the penetration depth T according to time t, must therefore also be adapted correspondingly so that the synchronization of the axial feed Z remains in accordance with the equation Z=P/360°. These are the known kinematics implemented in machine-tool control systems or NC control systems when producing a thread by means of an axially operating threading tool such as a tap or cold-forming tap.

Figure 18:
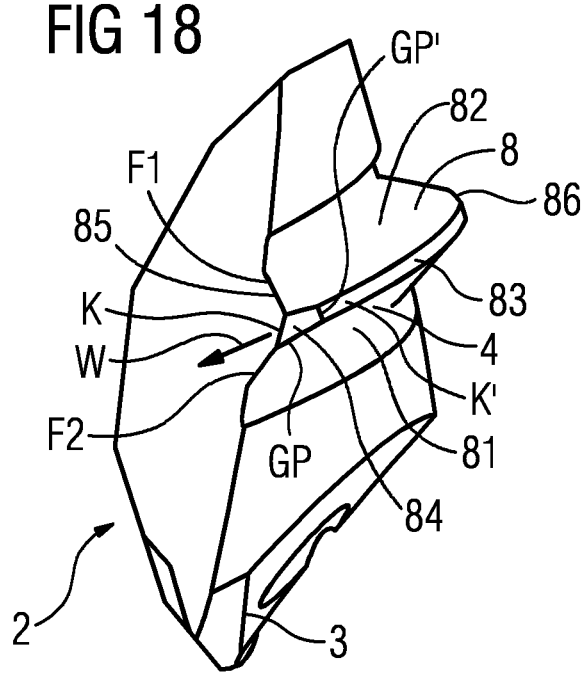
FIG. 18 shows a tapping and chip-removal tooth of a drilling and threading tool in a perspective view from the front.

Following the threading process (first working phase), there is then, in particular in the second working phase, a deceleration procedure or a deceleration movement AB with a range $\Delta\varphi$ of the angle of rotation between the values $\varphi_0$ and $\varphi_n$ for the angles of rotation and an associated penetration depth range $\Delta T$ which, in the example in FIG. 18, extends from T($\varphi_0$)=−16 mm to T($\varphi_n$)=−17 mm. At the end of the deceleration movement AB, a reversal point UP is reached at which the tool 2 comes to a halt for a short period of time both in terms of the rotational movement and in terms of the axial feed movement. The maximum range $\varphi_L$ of the angle of rotation, where $\varphi_L = \varphi_G + \Delta\varphi$, and the maximum penetration depth $T_L$ for producing the tapped hole, are reached at the reversal point UP.

During the deceleration procedure or the deceleration movement AB, the axial feed rate is reduced depending on the angle of rotation which corresponds to the slope of the illustrated graph for the function $T(\varphi)$, and to be precise according to a dependency or function which is preferably strictly monotonic (pitch always decreasing) or monotonic (pitch decreasing and possibly also zero in places) but may also temporarily rise slightly again in subsections. The pitch is preferably successively reduced in a predetermined number n of individual defined programmed or stored substeps or deceleration steps Si, where the total or number n is chosen to be a natural number with n>1, generally 200>n>2, in particular 20>n>5 and where i is the index for the deceleration step Si and is between 1 and n, i.e. $1 \le i \le n$.

In each substep or deceleration step $S_i$, synchronization of the axial feed T (or the feed rate dT/dt) and the angle of rotation $\varphi$ (or the rotational speed $d\varphi/dt$), corresponding to the control of a threading process, is preferably set or programmed by an associated predetermined function $T_i(\varphi)$ with an associated value interval $[T_{i-1}, T_i]$ over the associated angle of rotation interval $[\varphi_{i-1}, \varphi_i]$ being programmed or assigned to each deceleration step $S_i$ with $1 \le i \le n$.

The function $T_i(\varphi)$ is preferably linear and the graph therefore (idealized) a straight line.

The programmed or stored pitch here decreases in steps or successively, i.e. $\|dTi/d\varphi\| > \|dTi+1/d\varphi\|$, from each deceleration step $S_i$ to the next deceleration step $S_{i+1}$. The pitch corresponds in each case to a pitch parameter.

In an advantageous embodiment, this pitch parameter is programmed as the thread pitch in the CNC control system, i.e. in particular as an interpolation parameter along the z-axis or the thread axis M in a path condition G33, in particular G331 and G332. As a result, the path conditions or G functions already predetermined in the control program can be used and only the input parameter of the thread pitch needs to be changed or reprogrammed successively.

Thus, in each deceleration step $S_i$, the associated pitch parameter $$P_i = \|dTi/d\varphi\|$$

is therefore programmed or set, wherein $$P_{i+1} < P_i$$

for all i with $1 \le i \le n$. Moreover, $$P_i < P,$$

i.e. the pitch in the second working phase or during the deceleration movement AB is smaller than the thread pitch P during the first working phase. In particular, however, without limiting the general nature of the invention, it is possible that $P_i = P(n-i)/n$. The last value $P_n$ is generally always greater than 0 even when it is the smallest value of the values $P_i$.

The values of $P_i$ can, for example, be chosen such that an uninterrupted continued movement from the threading movement into the relief-cutting region is possible. It is intended in particular that the speed of the tool is maintained as much as possible. Consequently, different conditions can, for example, be formulated which can be reproduced in approximation functions.

The equation $$T(\varphi) = T_{i-1} - (P_i/360°)(\varphi - \varphi_{i-1})$$

here applies in each deceleration step $S_i$ for all i with $1 \le i \le n$ for $\varphi \in [\varphi_{i-1}, \varphi_i]$ with the boundary conditions $T(\varphi_{i-1}) = T_{i-1}$ and $T(\varphi_i) = T_i$.

The angle of rotation range $\Delta\varphi$ for the deceleration movement AB in the second working phase is generally chosen to be smaller than the angle of rotation range $\varphi_G$ for the threading in the first working phase, in particular is chosen to be $\Delta\varphi < 0.5\,\varphi_G$ and preferably $\Delta\varphi < 0.2\,\varphi_G$. This can in particular depend on how large the usable thread length is. Another influencing factor is the intended function in the undercut. If, as well as just decelerating, it is desired additionally to make further rotations in order to cut out the chips, further revolutions can be added (see FIGS. 21 and 22 below).

The penetration depth range (or the maximum penetration depth) $\Delta T$ for the deceleration movement AB in the second working phase is generally chosen to be smaller than the penetration depth range or the thread length $T_G$ for the threading in the first working phase, in particular is chosen to be $\Delta T < 0.5\,T_G$, preferably $\Delta T < 0.2\,T_G$.

The penetration depth range $\Delta T$ for the deceleration movement AB can in particular be chosen to be equal to P. A penetration depth range $\Delta T$ which is smaller than P is also possible in order to keep the tapped hole depth smaller, for example 0.5 P or 0.25 P. It may also be favorable, for chip removal reasons, to choose larger undercut heights or a larger penetration depth range $\Delta T$, in particular up to 2 P and in exceptional cases even larger.

In an exemplary embodiment of a deceleration movement AB in an angle of rotation range $\Delta\varphi$ and an associated penetration depth range $\Delta T$, by way of example and with no limitation of the general nature of the invention, it is chosen that n=10 and thus ten deceleration steps $S_1$ to $S_{10}$ are provided with the associated pitch parameters $P_1$ to $P_{10}$. The angle of rotation range $\Delta\varphi$ is divided correspondingly into the n=10 angle of rotation intervals $[\varphi_0, \varphi_1], [\varphi_1, \varphi_2], \ldots, [\varphi_{i-1}, \varphi_i], [\varphi_i, \varphi_{i+1}], \ldots [\varphi_9, \varphi_{10}]$ and associated with these intervals are the corresponding penetration depth intervals $[T_0, T_1], [T_1, T_2], \ldots, [T_{i-1}, T_i], [T_i, T_{i+1}], \ldots, [T_9, T_{10}]$ into which the penetration depth range $\Delta T$ is divided which, in the example in FIG. 12, extends from $T(\varphi_0) = -16$ mm to $T(\varphi_{10}) = -17$ mm and/or corresponds to the thread pitch $P = -1$ mm. Each interval corresponds with a substep $S_i$.

An associated pitch parameter $P_i$, in particular as a thread pitch or interpolation parameter of the CNC control system, is then assigned to each of these intervals of each deceleration step $S_i$, i.e. the pitch $P_1$ to the two intervals $[\varphi_0, \varphi_1]$ and $[T_0, T_1]$, the pitch $P_2$ to the interval pair $[\varphi_1, \varphi_2]$ and $[T_1, T_2]$, and so on as far as the pitch $P_{10}$ for the last interval pair $[\varphi_9, \varphi_{10}]$ and $[T_9, T_{10}]$.

The pitch values $P_1$ to $P_{10}$ are chosen such that $P_{i+1} < P_i$ for i=1 up to i=n, in particular n=10. In each subsection or deceleration step $S_i$, the thread pitch $P_1$ to $P_{10}$ is constant such that essentially straight subsections of the graph of the function $T(\varphi)$ result in which a synchronized "thread movement" takes place, i.e. the axial feed rate corresponds to the quotient of Pi/360°.

The penetration depth intervals in the deceleration steps Si for all i with $1 \le i \le n$ (here, for example, n=10) are preferably chosen to be the same such that the length of the intervals $T_1 - T_0 = T_2 - T_i = T_i - T_{i-1} = T_{i+1} - T_i = T_n - T_{n-1}$ is chosen to be the same or equidistant, i.e.

$$T_i - T_{i-1} = \Delta T/n.$$

Because the axial feed in each subsection or subinterval is chosen to be constant in this exemplary embodiment, and because $T_{i+1} - T_i$ is chosen to be the same or equidistant for all i, for a declining pitch $P_i$ and hence a decreasing axial feed rate, growing angle of rotation intervals $\varphi_{i+1}-\varphi_i$ $$\varphi_{i+1}-\varphi_i > \varphi_i-\varphi_{i-1}$$

result in the angle of rotation range $\Delta T$ in the deceleration steps $S_i$. In other words, the angle of rotation spacing $\varphi_2-\varphi_1$ is smaller than the angle of rotation spacing $\varphi_3-\varphi_2$ and the angle of rotation spacing $\varphi_{i+1}-\varphi_i$ is greater than the angular spacing $\varphi_i-\varphi_{i-1}$. The largest angular spacing or angular range is covered by the last subsection between the angle of rotation values $\varphi_{10}-\varphi_9$. This corresponds to a continuous deceleration procedure which is slowed down in each subsection or deceleration step $S_i$.

During the deceleration movement AB, the temporal dependence of the rotational speed $d\varphi/dt$ and the axial feed rate $dT/dt$ are chosen or controlled or programmed such that the tool 2 comes to rest at the reversal point UP=$(\varphi_n, T_n)$ or $(\varphi_{10}, T_{10})$, i.e. $d\varphi/dt=0$ and $dT/dt=0$ at $\varphi=\varphi_n$ or $T=T_n$ or at $\varphi=\varphi_{10}$ or $T=T_{10}$. The tool 2 at the reversal point UP is also shown in FIG. 7. The reduction of the rotational speed $d\varphi/dt$ and the axial feed rate $dT/dt$ to 0 depending on time t can, for example, take place continuously during the deceleration movement AB or alternatively, for example, only in the last deceleration step $S_n$ or $S_{10}$.

In practice not exactly linear and instead slightly rounded lines of the graph in the deceleration steps $S_1$ to $S_{10}$ or during the deceleration movement AB are the physical consequence of the inertia of the drive system, in particular the control system and the machine drives, and the mass inertia of the components moved. Represented in an idealized fashion or saved in the program of the deceleration movement itself, however, the described sequence results of linear functions or concatenated linear sections with a stepwise decreasing pitch, i.e. a stepwise decreasing respective constant feed rate, in the individual deceleration steps $S_i$, for example $S_1$ to $S_{10}$.

Before a retracting or reversing movement is initiated, another intermediate step may be performed, similar to a cleaning procedure. Here, chip root residues can, for example, be removed by further rotation of the tool or remains of the thread tips can be cleaned out from the peripheral groove in order to obtain a cleaner cylindrical region. A screw can then be better screwed in.

Figure 9:
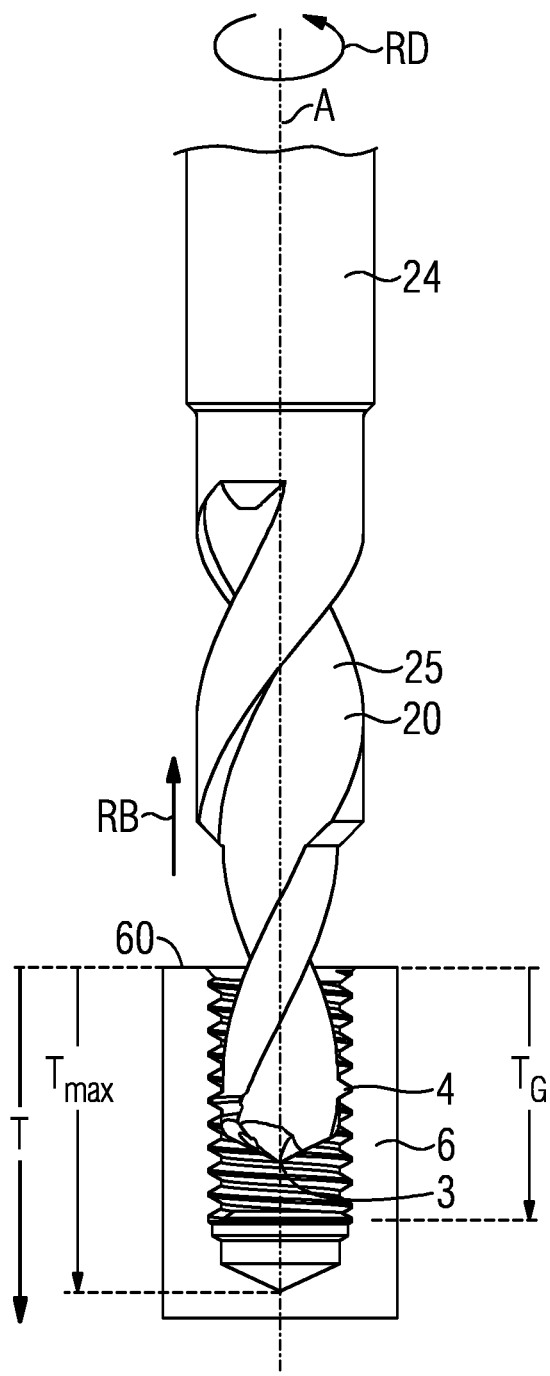
Figure 10:
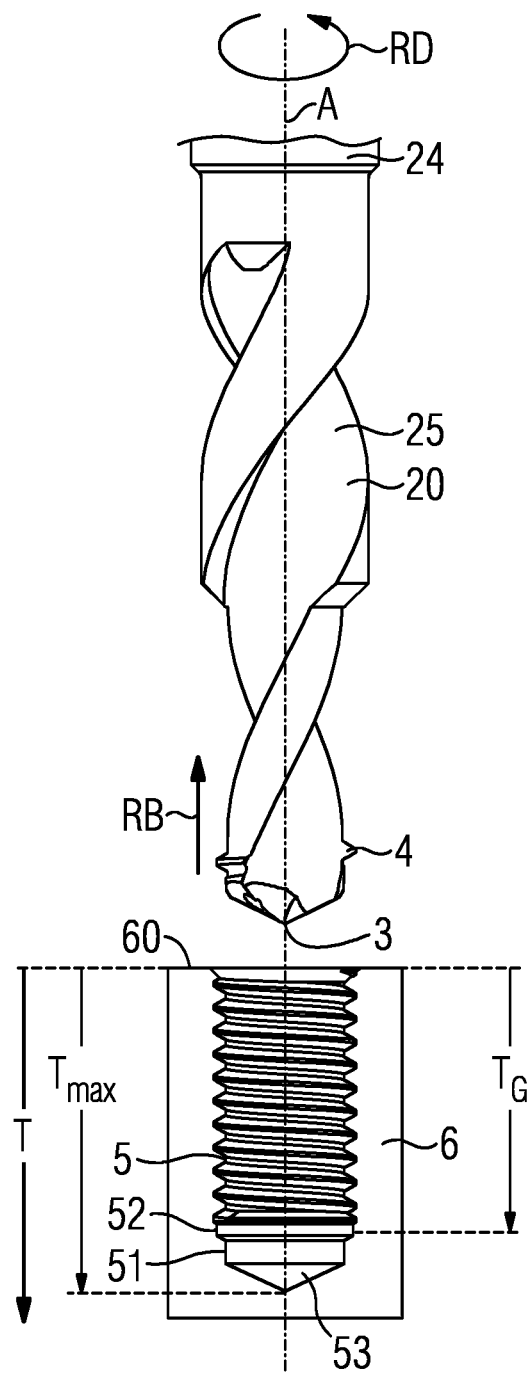

After the reversal point UP has been reached, in an embodiment as illustrated in particular in FIG. 12, a reversing movement or backward movement RB is then initiated which first comprises in a first reversing phase an acceleration movement BB until the point of engagement in the thread turns 50, as illustrated for example in FIG. 8, and in a second reversing phase a backward movement RB in which the tool 2 is unscrewed outward through the thread turns 50 in a synchronized fashion, as illustrated for example in FIG. 9. In an advantageous embodiment, the control curve or function according to FIG. 12 can then be used or executed in the reverse order and/or symmetrically with respect to the reversal point UP.

The rotational movement is inverted for the backward movement RB or BB from the forward direction of rotation VD into the backward direction of rotation RD, i.e. the angle of rotation $\varphi$, starting from $\varphi=\varphi_n$ or $\varphi=\varphi_{10}$ preferably at the reversal point UP, is reduced or reversed in a negative direction until the starting value $\varphi=0$ is finally reached again and the tool 2 exits the workpiece 6. The dependency or function $T(\varphi)$, preferably assumed unchanged, now causes the amount of the penetration depth T to become smaller as the angle of rotation decreases, i.e. decreases from $T=T_n$ or $T=T_{10}$ at the reversal point UP back to $T=0$ at the entry point EP where $\varphi=0$, which is therefore at the same time also the exit point. In particular, the first reversing phase corresponds to the second working phase, and the second reversing phase to the first working phase.

An embodiment for the second working phase can in particular also be used in a reverse order for the first reversing phase. The same dependency or function $T(\varphi)$ in the opposite order can therefore be used in the first reversing phase, starting from the reversal point UP, for the acceleration movement BB in a reversal of the deceleration movement AB.

However, other functions $T(\varphi)$ and substeps can also be used which preferably return to the point $(\varphi_0, T_0)$ at which the deceleration movement AB also began or the first working phase ended such that the correct engagement point for the tool for its return through the thread turns 50 can be reached.

Starting from the final angular value $\varphi_n$ or $\varphi_{10}$, an acceleration phase is preferably first performed in reverse order as a first reversing phase with an acceleration movement BB with the same incremental steps. These steps are, however, now acceleration steps $S_j$ with $n+1 \leq j \leq 2n$, beginning with $S_{11}$ to $S_{20}$ for n=10. An associated angle of rotation interval $[\varphi_{10}, \varphi_{11}], [\varphi_{11}, \varphi_{12}], \ldots, [\varphi_{j-1}, \varphi_j], [\varphi_j, \varphi_{j+1}], \ldots [\varphi_{19}, \varphi_{20}]$, where $\varphi_j$ from the first reversing phase simply corresponds to $\varphi_i$ from the second working phase if i=j=n is set, is assigned to each of these acceleration steps $S_j$. The pitch parameters likewise remain the same but in reverse order. i.e. they run from $P_{10}$ via $P_9$, $P_8$ to $P_1$ for the subsections of the control curve according to FIG. 12 from right to left until the depth value $T_0$ is reached. A new angular value $\varphi_{11}$ is assumed after the angular value $\varphi_{10}$ and the interval $[\varphi_{10}, \varphi_{11}]$ corresponds to the interval $[T_{10}, T_9]$ with the thread pitch $P_{10}$, and the subsequent angular interval $[\varphi_{11}, \varphi_{12}]$ corresponds to the penetration depth interval $[T_9, T_8]$ with the corresponding thread pitch $P_9$, etc as far as the last subsection of $[\varphi_{19}, \varphi_{20}]$ corresponding to $[T_1, T_0]$ with the thread pitch $P_1$.

Following this, the linear section of the curve will then run in the opposite direction to FIG. 12 from $\varphi_0$ to $\varphi=0$ corresponding to the penetration depth T from $T_0$ to T=0. The axial feed rate corresponding to the slope of the straight line in FIG. 12 for the backward movement is now again $P/360°$ with the opposite direction. As a result, the tool is guided through the thread produced in the forward movement in exactly the opposite way without any damage happening to the thread turns produced whilst in the thread. The backward movement is therefore synchronized in exactly the same way as the forward movement but in the opposite direction of rotation such that the angle $\varphi$ decreases again from the angle $\varphi_n$ backward in its value as far as $\varphi=0$ and also, with the axial feed rate reversed, the thread depth now increases in mathematical terms from $T=T_0$ to T=0.

Using the same control curve or function $T(\varphi)$ as in the forward movement VB in both working phases for the backward movement RB as well in both reversing phases on the one hand has the advantage that the tool 2 can be controlled precisely in terms of position and movement and is situated in the correct position in particular at the engagement point in the thread turns 50, and in this way the forces can be kept very low during the reversing and/or a high return or retraction speed is enabled.

In an embodiment of an implementation of the described dependencies or functions for $T(\varphi)$, the values of the penetration depth T are used as input parameters which are measured or are predetermined by the control system or program and the associated values of the angle of rotation $\varphi$ result from the dependency by means of the assigned pitch parameters P and $P_i$.

An NC program for taps or thread formers can therefore be chosen, in particular with a G33, in particular G331 and G332, path condition with a thread pitch that needs to be input and a series or quantity of values can then be provided for the penetration depth at which a switch is made to a new thread pitch parameter, wherein the thread pitch parameter is maintained until the next value of the penetration depth.

Figure 13:
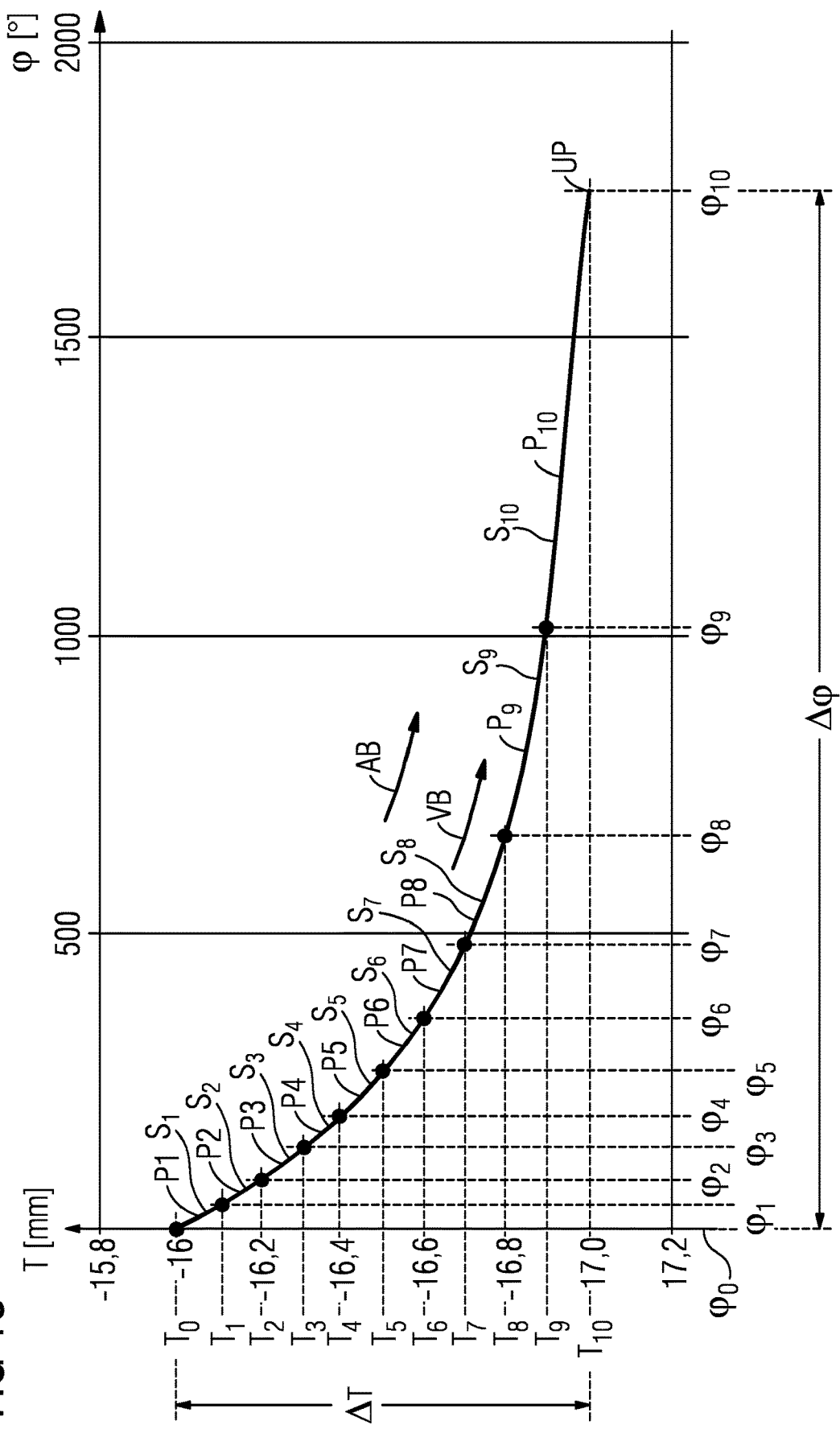
FIG. 13 shows the end section of the graph shown in FIG. 12 in the forward movement as a deceleration procedure.

FIG. 13 now shows an exemplary embodiment of a deceleration movement AB in an enlarged view of the lower right-hand region of the diagram in FIG. 12 in an angle of rotation range $\Delta\varphi$ and an associated penetration depth range $\Delta T$. In FIG. 13, n=10 has been chosen by way of example and with no limitation of the general nature of the invention and thus ten deceleration steps $S_1$ to $S_{10}$ are indicated with the associated pitch parameters $P_1$ to $P_{10}$.

The angle of rotation range $\Delta\varphi$ is divided correspondingly into the n=10 angle of rotation intervals $[\varphi_0, \varphi_1]$, $[\varphi_1, \varphi_2]$, ..., $[\varphi_{i-1}, \varphi_i]$, $[\varphi_i, \varphi_{i+1}]$, ... $[\varphi_9, \varphi_{10}]$ and associated with these intervals are the corresponding penetration depth intervals $[T_0, T_1]$, $[T_1, T_2]$, ..., $[T_{i-1}, T_i]$, $[T_i, T_{i+1}]$, ..., $[T_9, T_{10}]$ into which the penetration depth range $\Delta T$ is divided which, in the example in FIG. 12, extends from $T(\varphi_0)=-16$ mm to $T(\varphi_{10})=-17$ mm and/or corresponds to the thread pitch P=-1 mm. Each interval corresponds to a substep $S_i$.

In contrast to FIG. 12, in FIG. 13 the difference angle of rotation is charted starting from $\varphi_0$. If in FIG. 13 it is desired to plot the same values on the angle of rotation axis for $\varphi$ as in FIG. 12, all the values on the horizontal axis need to be added to the value of $\varphi_0$, which is for example 5800° in FIG. 12. The deceleration movement AB begins at the angle of rotation value $\varphi_0$ and the associated penetration depth value $T_0$ and ends at the final angle of rotation value $\varphi_{10}$ and the associated penetration depth value $T_{10}$.

An associated pitch parameter $P_i$, in particular as the thread pitch or interpolation parameter of the CNC control system, is then assigned to each of these intervals of each deceleration step $S_i$, i.e. the pitch $P_1$ to the two intervals $[\varphi_0, \varphi_1]$ and $[T_0, T_1]$, the pitch $P_2$ to the interval pair $[\varphi_1, \varphi_2]$ and $[T_1, T_2]$, and so on as far as the pitch $P_{10}$ for the last interval pair $[\varphi_9, \varphi_{10}]$ and $[T_9, T_{10}]$.

The pitch values $P_1$ to $P_{10}$ are chosen such that $P_{i+1}<P_i$ for i=1 up to i=10 in FIG. 13 or n in FIG. 12. In each subsection or deceleration step $S_i$, the thread pitch $P_1$ to $P_{10}$ remains constant such that essentially straight subsections of the graph of the function $T(\varphi)$ result in which a synchronized "thread movement" takes place, i.e. the axial feed rate corresponds to the quotient of $P_i/360°$.

In the exemplary embodiment illustrated in FIG. 13, the penetration depth intervals in the deceleration steps $S_i$ for all i with 1≤i≤n (here, for example, n=10) have been chosen to be the same such that the length of the intervals $T_1-T_0=T_2-T_1=T_i-T_{i-1}=T_{i+1}-T_i=T_n-T_{n-1}$ is chosen to be the same or equidistant, i.e.

$$T_i-T_{i-1}=\Delta T/n$$

is chosen in the exemplary embodiment illustrated in FIG. 13 to be -1 mm/10=0.1 mm.

Because the axial feed in each subsection or subinterval is chosen to be constant in the exemplary embodiment in FIG. 13, and because $T_{i+1}-T_i$ is chosen to be the same or equidistant for all i, for a declining pitch $P_i$ and hence a decreasing axial feed rate, growing angle of rotation intervals $\varphi_{i+1}-\varphi_i$ $$\varphi_{i+1}-\varphi_i>\varphi_i-\varphi_{i-1}$$

result in the angle of rotation range $\Delta T$ in the deceleration steps $S_i$. In other words, the angle of rotation spacing $\varphi_2-\varphi_1$ is smaller than the angle of rotation spacing $\varphi_3-\varphi_2$ and the angle of rotation spacing $\varphi_{i+1}-\varphi_i$ is greater than the angular spacing $\varphi_i-\varphi_{i-1}$. The largest angular spacing or angular range is covered by the last subsection between the angle of rotation values $\varphi_{10}-\varphi_9$. This corresponds to a continuous deceleration procedure which is slowed down in each subsection or deceleration step $S_i$.

During the deceleration movement AB, the temporal dependence of the rotational speed $d\varphi/dt$ and the axial feed rate $dT/dt$ is chosen or controlled or programmed such that the tool 2 comes to rest at the reversal point UP=$(\varphi_n, T_n)$ or $(\varphi_{10}, T_{10})$, i.e. $d\varphi/dt=0$ and $dT/dt=0$ at $\varphi=\varphi_n$ or $T=T_n$ or at $\varphi=\varphi_{10}$ or $T=T_{10}$.

The reduction of the rotational speed $d\varphi/dt$ and the axial feed rate $dT/dt$ to 0 depending on time t can, for example, take place continuously during the deceleration movement AB or alternatively, for example, only in the last deceleration step $S_n$ or $S_{10}$.

The in practice not exactly linear and instead slightly rounded lines of the graphs in the deceleration steps $S_1$ to $S_{10}$ in FIG. 13 are the physical consequence of the inertia of the drive system, in particular the control system, including its interpolation routines for smoothing the transitions, and the machine drives and the mass inertia of the components moved. Represented in an idealized fashion or saved in the program of the deceleration movement itself, however, the described sequence results of linear functions or concatenated linear sections with a stepwise decreasing pitch, i.e. a stepwise decreasing respective constant feed rate, in the individual deceleration steps $S_i$, for example $S_1$ to $S_{10}$.

Figure 14:
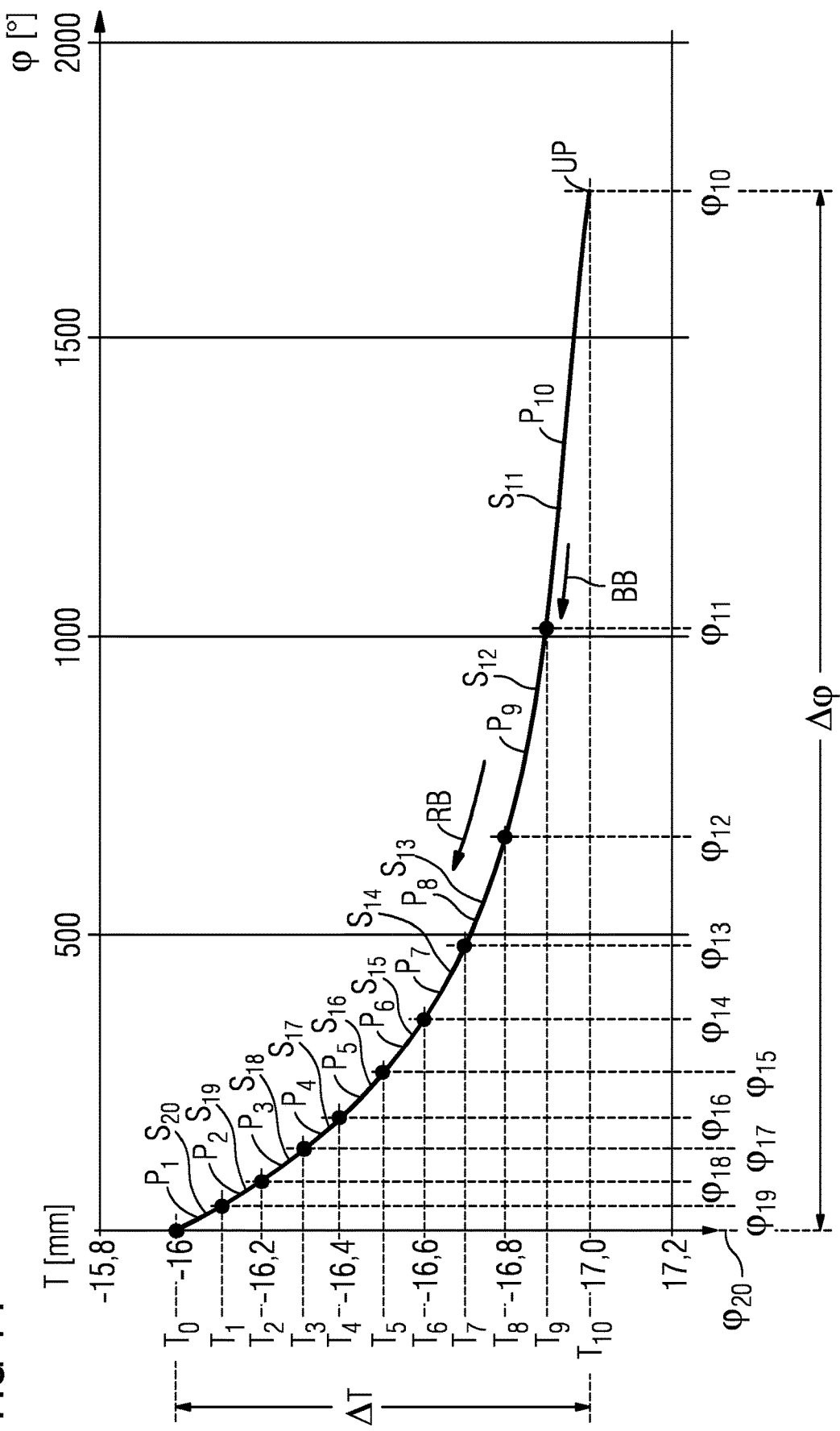
FIG. 14 shows the end section of the graph shown in FIG. 12 in the backward movement as an acceleration procedure.

An exemplary embodiment is shown in FIG. 14 of how the same dependency or function $T(\varphi)$ in the opposite order can be used in the first reversing phase, starting from the reversal point UP, for the acceleration movement BB in a reversal of the deceleration movement AB, for example according to FIGS. 12 and 13.

Figure 5:
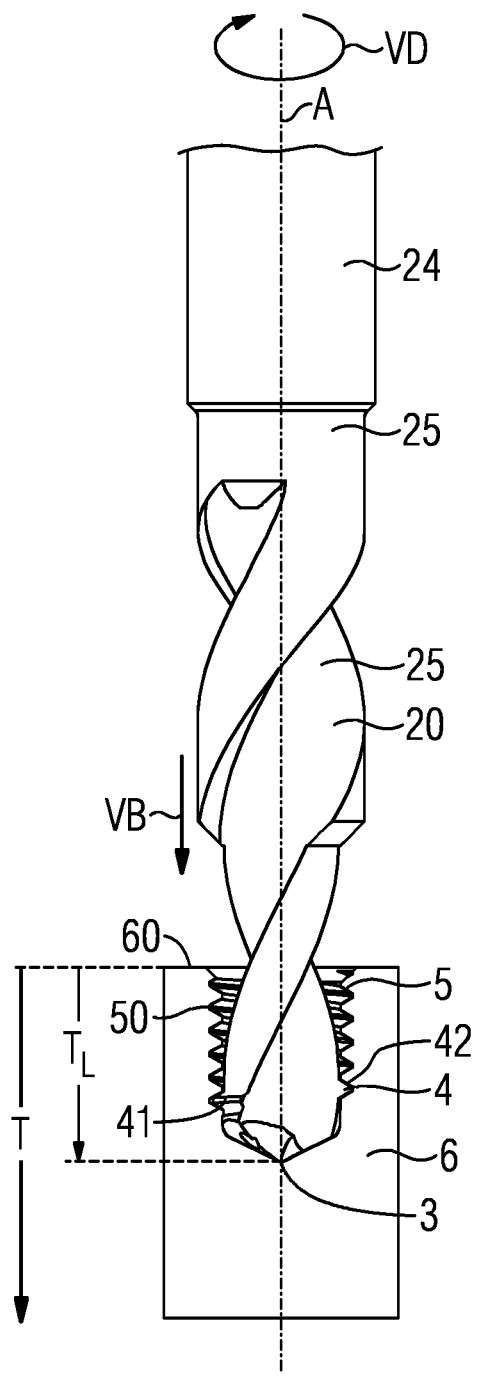

However, different functions $T(\varphi)$ and substeps to those in FIG. 5 can also be used which preferably return to the point $(\varphi_0, T_0)$ at which the deceleration movement AB also began or the first working phase ended such that the correct engagement point for the tool for its return through the thread turns 50 can be reached.

Starting from the final angular value $\varphi_n$ or $\varphi_{10}$, an acceleration phase is preferably first performed in reverse order as a first reversing phase with an acceleration movement BB with the same incremental steps. These steps are, however, now acceleration steps $S_j$ with n+1≤j≤2 n, beginning with $S_{11}$ to $S_{20}$ for n=10.

An associated angle of rotation interval $[\varphi_{10}, \varphi_{11}]$, $[\varphi_{11}, \varphi_{12}]$, ..., $[\varphi_{j-1}, \varphi_j]$, $[\varphi_j, \varphi_{j+1}]$, ... $[\varphi_{19}, \varphi_{20}]$, where $\varphi_j$ from the first reversing phase simply corresponds to $\varphi_i$ from the second working phase if i=j=n is set, is assigned to each of these acceleration steps $S_j$. The pitch parameters likewise remain the same but in reverse order. i.e. in FIG. 5 they run from $P_{10}$ via $P_9$, $P_8$ to $P_1$ for the subsections of the control curve according to FIG. 13 from right to left until the depth value $T_0$ is reached. According to FIG. 14, the new angular value $\varphi_{11}$ is assumed after the angular value $\varphi_{10}$ and the interval $[\varphi_{10}, \varphi_{11}]$ corresponds to the interval $[T_{10}, T_9]$ with the thread pitch $P_{10}$, and the subsequent angular interval $[\varphi_{11}, \varphi_{12}]$ corresponds to the penetration depth interval $[T_9$, $T_8$] with the corresponding thread pitch $P_9$, etc as far as the last subsection of [$\varphi_{19}$, $\varphi_{20}$] corresponding to [$T_1$, $T_0$] with the thread pitch $P_1$.

Following this, the linear section of the curve will then run in the opposite direction to FIG. 12 from $\varphi_0$ to $\varphi=0$ corresponding to the penetration depth T from $T_0$ to T=0. The axial feed rate corresponding to the slope of the straight line in FIG. 1 for the backward movement is now again P/360° with the opposite direction. As a result, the tool is guided through the thread produced in the forward movement in exactly the opposite way without any damage happening to the thread turns produced whilst in the thread. The backward movement is therefore synchronized in exactly the same way as the forward movement but in the opposite direction of rotation such that the angle $\varphi$ decreases again from the angle $\varphi_n$ backward in its value as far as $\varphi=0$ and also, with the axial feed rate reversed, the thread depth now increases in mathematical terms from $T=T_0$ to T=0.

Using the same control curve or function $T(\varphi)$ as in the forward movement VB in both working phases for the backward movement RB as well in both reversing phases on the one hand has the advantage that the tool 2 can be controlled precisely in terms of position and movement and is situated in the correct position in particular at the engagement point in the thread turns 50, and in this way the forces can be kept very low during the reversing and/or a high return or retraction speed is enabled.

In an embodiment of an implementation of the described dependencies or functions for $T(\varphi)$, the values of the penetration depth T are used as input parameters which are measured or are predetermined by the control system or program and the associated values of the angle of rotation $\varphi$ result from the dependency by means of the assigned pitch parameters P and $P_i$.

A CNC program for taps or thread formers can therefore be chosen, in particular with a G33, in particular G331 and G332, path condition with a thread pitch that needs to be input and a series or quantity of values can then be provided for the penetration depth at which a switch is made to a new thread pitch parameter, wherein the thread pitch parameter is maintained until the next value of the penetration depth.

A sequence could, for example, be:

Working Movement:

At the penetration depth T=0, choose the thread pitch parameter P and maintain this until $T=T_0$. A rotational speed is set.

At $T=T_0$, change to the thread pitch parameter $P_1$ and maintain it until $T=T_1$.

At $T=T_1$, change to the thread pitch parameter $Pi+_1$ and maintain it until $T=Ti+_1$ for all i with $1 \leq i \leq n$.

Reduce the rotational speed to 0 at $T=T_n$.

and preferably for the

Reversing Movement:

At $T=T_n$, reverse the axial feed movement and the rotational movement with a set rotational speed and restart in the respective opposite direction with the thread pitch parameter $P_n$ and maintain it until $T=T_{n-1}$.

At $T=T_j$, change to the thread pitch parameter $P_j$ and maintain it until $T=T_{j-1}$ for all j as a descending index with $1 \leq j \leq n-1$.

At $T=T_0$, choose the thread pitch parameter P and maintain it until T=0.

Even if this embodiment of the working movement in the second working phase and/or the reversing movement in the first reversing phase, which in particular corresponds to a linear interpolation, is advantageous because of its simple implementation in existing machine programs, according to the invention in all the embodiments other dependencies or functions or interpolations can also be provided in individual substeps or subintervals for the correlation between T and $\varphi$ or combinations thereof.

In the case of the linear interpolation described, the linear curve sections or graph sections are joined together continuously, i.e. the start points ($\varphi$, $T_i$) of each interval correspond to the end points of the respective preceding interval and in the case of the first interval to the end point ($\varphi_0$, $T_0$) of the linear graph of the threading. These link points are also referred to as grid points.

In all the embodiments or interpolations, curve sections or graph sections, which are joined together (or linked, interconnected) in a continuously differentiable manner, can also be chosen instead of linear sections. This means that not only does the start point of each interval coincide with the end point of the preceding interval, i.e. a continuous transition occurs at the link points between the intervals, but in addition the graph sections or their functions are also differentiable in these link points and their derivatives have the same value. As a result, smooth or continuously differentiable transitions between the graphs are achieved in the individual deceleration steps or intervals, which is beneficial for the movement sequence. The transition at the angle of rotation $\varphi_0$ from the threading movement in the first working phase to the deceleration movement AB in the second working phase or then correspondingly preferably also from the first reversing phase to the second reversing phase is preferably also chosen to be continuously differentiable or with the same pitch.

Examples of functions that are suitable for such a continuously differentiable interpolation are polynomials of higher degrees than 1, in particular third-degree polynomials such as, for example, cubic splines. A spline interpolation can be applied here. By using a third-degree polynomial function as a spline function $$T(\varphi)=a_3\varphi^3+a_2\varphi^2+a_1\varphi+a_0$$

with the usual boundary conditions for spline interpolation, a function which is continuous up to its third derivative can, for example, be created.

Moreover, a continuous, in particular strictly monotonically or alternatively monotonically falling function for the deceleration procedure or at least the majority of the deceleration steps $S_i$, for example an exponential function or a logarithmic function, can also be used. For example, the following exponential function can be used:

$$T = -e^{\frac{-P}{\pi \cdot fd} \cdot x} + 1;$$

where fd is the flank diameter and x is a consecutive natural number.

The described theoretical curves of functions can in particular be reproduced by a corresponding number of individual NC control datasets.

In a further embodiment of an implementation of the described dependencies or functions for $T(\varphi)$, the values of the angle of rotation $\varphi$ are used as input parameters which are measured or are predetermined by the control system or program and the associated values of the penetration depth T result from the dependency by means of the pitch parameters P and $P_i$.

In a third variant, time can also be predetermined as an input parameter and the values of the angle of rotation $\varphi(t)$ and the penetration depth T(t) are formed from the dependency with time (t) and the dependency with each other by means of the pitch parameters P and $P_i$.

In an embodiment, the controlling or synchronization can take place in an open control loop with no measurement of the process variables penetration depth and angle of rotation. A penetration depth value is here assigned to each angle of rotation value by means of a value table or by calculation using the stored formulae, and the rotary drive and the axial drive are activated accordingly.

In a further embodiment, measurement of at least one of the two process variables penetration depth and angle of rotation can also take place and the measured values can be fed back to the control system in order to make an adjustment, for example according to the target curve shown in FIG. 12, in a closed loop. The angle of rotation φ is usually determined in the region of the drive, in particular the drive spindle, by means of angle of rotation sensors or measurement of physical variables which are clearly correlated with the angle of rotation. It is, however, also in principle possible to measure the angle of rotation directly at the tool 2. The penetration depth T can be measured by axial position sensors and here too again generally at the drive, in particular the drive spindle, or also, in a particular embodiment, at the tool or workpiece itself.

In further embodiments, a smoothing step or constant circulating step can additionally take place in the second working phase, during which the penetration depth T(φ) is constant or at least no further feed movement is executed in the forward direction. The direction of rotation of the rotational movement preferably remains the same during the smoothing step and is therefore not reversed.

In an embodiment, when the maximum penetration depth ΔT is reached at an angle of rotation $T_{n-1}$, the corresponding value T(φ) for the following step $S_n$ is kept constant as far as the angle of rotation $T_n$ at the reversal point UP, i.e. $T(\varphi_{n-1})=T_{n-1}=T_n=T(\varphi_n)$.

In a further embodiment, the maximum penetration depth ΔT is reached at an angle of rotation $\varphi_{n-2}$ with the corresponding value $T(\varphi_{n-2})=T_{n-2}$. The value T(φ) is then reduced again for the following step $S_{n-1}$ as far as the angle of rotation $\varphi_{n-1}$, i.e. the axial feed direction is reversed, and the penetration depth is reduced to the value $T(\varphi_{n-1})=T_{n-1}<T_{n-2}$. The tool therefore runs with a slight reversing feed in the circumferential groove. This defined movement in a negative T direction away from the bottom of the bore can be advantageous for further improving the undercut or the peripheral groove in terms of screwability. Beyond the angle of rotation $\varphi_{n-1}$, the corresponding value T(φ) is held constant again for the following step $S_n$ as far as the angle of rotation $\varphi_n$ at the reversal point UP, i.e. $T(\varphi_{n-1})=T_{n-1}=T_n=T(\varphi_n)$. It is, however, possible, especially where a peripheral groove has already (largely) been produced, for the tool also to make a relatively large and/or quick return movement and/or also an axial to-and-fro movement during the smoothing, which can also have an axial feed per 360° which is even greater than the thread pitch P. The tool and its tapping teeth thus, in step $S_n$, rotate in a circular or cylindrical path with no pitch or even, in step $S_{n-1}$, with a positive pitch again by a small amount outward in the workpiece. This movement serves in particular to smooth the peripheral groove and to clean the surface of the workpiece, to evacuate as much as possible of the chip material from the tapped bore produced and possibly to relieve stresses between the workpiece and the tool which have built up previously because of the machining forces. The step $S_n$ as the last step of the deceleration movement AB and also the penultimate step $S_{n-1}$ can thus also be referred to as a smoothing step. The whole angle of rotation $\varphi_n-\varphi_{n-1}$ of the smoothing step $S_n$ or $\varphi_n-\varphi_{n-2}$ of the smoothing step $S_n$ and $S_{n-1}$ can be freely chosen within wide limits, for example between 180° and 2000° and is usually chosen to be larger, for example three times larger, than the angle of rotation $\varphi_{n-1}-\varphi_0$ or $\varphi_{n-2}-\varphi_0$ of the preceding monotonically falling section (transition region). During the reversing movement RB, in the first reversing phase some or all of the smoothing step can, for example, also be omitted.

By virtue of the measures according to the invention, advantageous movement sequences can be obtained in the transition to the relief cut (peripheral groove) and in the relief cut itself. The working speed of the tool can be as high and uniform (constant) as possible. The machine (including control system) can reproduce the movement in a highly dynamic manner. A screwable geometry can moreover be produced in the relief cut or the peripheral groove.

If the ratios on the machine are considered, it can be seen that a mass inertia and an inertia in the drives and the control system are physically present. In order to keep the speed outside the thread high in the undercut too, i.e. the peripheral groove, the machine is put in a position to perform this movement preferably with a high tool path feed rate, in particular by virtue of a continuous movement path of the z-axis (variable T) and the axis of rotation (variable φ). This is then manifested in a high and continuous speed of the active tool teeth and cutters. This is in turn favorable for a uniform chip removal.

In order to program the machine, the theoretical movement paths can be translated into corresponding NC sets. Slight deviations or approximations (in the form of, for example, combined helical movements) can occur here.

In the technical implementation of a threading process such as the above, the temporal dependence on time t of the penetration depth T=T(t) and the angle of rotation φ=φ(t) or the rotational speed or frequency n=n(t) also needs to be established. The tool path feed rate v(t) (circumferential speed, machining speed, feed rate, cutting speed) resulting at the workpiece, i.e. the speed in a tangential direction to the trajectory, is established as a result.

The tool path feed rate v(t) depends on the radius r and hence on the tapped hole diameter, on the one hand, and the rotational speed $\omega(t)=d\varphi(t)/dt=2\pi n(t)$ according to the vector equation $\vec{v}=\vec{r}\times\vec{\omega}$, and is accordingly higher for larger radii r at the same rotational speed n, i.e. is higher for M8 threads (r=4 mm) than for M6 threads (r=3 mm).

For the present tool and the present process according to the invention with simultaneous drilling and threading, a uniform tool path feed rate v(t) must then be set for the drilling region 3 and the threading region 4, and the tool and the tool path feed rate must be coordinated optimally. It must in particular be ensured that the tapped hole is produced with a sufficient quality and sufficient service life of the tool. It is also important here to prevent excessively high accelerations and the concomitant forces on the tool. This is especially important for the drilling region 3 which became damaged or even completely broke in many early trials.

It is therefore intended that an at least approximately constant maximum tool path feed rate $v_{max}$ is reached or maintained ideally for as long as possible or over as long a period as possible during the process. This applies in particular for the deceleration movement or undercut movement AB.

The tool is generally optimized to this maximum value $v_{max}$ with respect to its performance and geometry. This maximum tool path feed rate $v_{max}$ corresponds to an at least approximately constant maximum rotational speed $n_{max}$ but this depends on the radius or diameter of the tool, as already described.

According to the EMUGE Handbook, pages 170 to 177, different cutting speeds should be chosen for drilling core holes depending on the material of the workpiece and the material of the drill (solid carbide or HSS), for example from 90 to 100 m/min in unhardened steel and cast iron and up to 150 m/min in aluminum alloys for the spiral drills specified there (min means minute, i.e. 60 seconds). According to the EMUGE Handbook, pages 282 to 283, different cutting speeds should likewise be chosen for tapping depending on the material of the workpiece and the material of the tap (solid carbide or HSS), for example from 40 to 100 m/min in unhardened steel and from 5 to 80 m/min in cast iron and from 10 to 60 m/min in aluminum alloys for the different types of taps specified there.

The values for the cutting speeds of a spiral drill and a tap in the same material sometimes differ significantly from these recommended values from the prior art. However, in the case of the combined tool according to the invention, the cutting speed or tool path feed rate for the drill cutters and tapping teeth with only slightly different radii must be practically the same. Moreover, the geometries of the taps and spiral drills from the EMUGE Handbook therefore cannot be translated to the combined tool and the process according to the invention because the axial length of the drilling region 3 and the threading region 4 of the combined tool must be chosen to be significantly shorter than in the case of the individual tools in the EMUGE Handbook. This is because otherwise there would not be a sufficient axial length remaining for the actual thread because of the integrated drilling process and the integrated undercut process. These axially shortened drilling and tapping regions can also be seen in the known tapping tool according to DE 10 2016 008 478 A1.

A suitable tool path feed rate for the above described optimization of the combined tool and the associated tapped hole production process must hence be found. Although, on the one hand, there is a need here to endeavor to obtain the highest possible machining speed or lowest possible cycle time, on the other hand, it must, however, be possible for the speed to be governed by the tool and the control system, i.e. for a compromise to be found between economic and technical requirements as part of the optimization.

The inventors have carried out trials and analysis and used different tool prototypes here which were constructed essentially according to FIG. 1 with the quality of a well-known EMUGE tool manufacturer in a GROB G552 modern high-quality production machine-tool with a SIEMENS 840D modern high-quality machine program control system.

After extensive trials and analysis by the inventors, values for the tool path feed rate $v_{max}$ from a value interval of 57 m/min to 189 m/min, in particular from 85 m/min to 132 m/min, have finally proved to be particularly expedient, in particular in aluminum materials. The following preferred rotational speed ranges in rpm (1/min=⅙₀ Hz) for the maximum rotational speed are derived from these tool path feed rate ranges.

In the case of an M6 thread (diameter 6 mm), the maximum rotational speed $n_{max}$ of the tool is situated between 3000 rpm and 10,000 rpm, preferably between 4500 rpm and 7000 rpm. In the case of a different thread diameter, the rotational speed or the rotational speed range changes according to the ratio between 6 mm and the other thread diameter, i.e. for example in the case of M8 instead of M6 by the factor 6/8=0.75. In the case of an M8 thread (diameter 8 mm), for example, the maximum speed $n_{max}$ of the tool is thus situated between 2250 rpm and 7500 rpm, preferably between 3375 rpm and 5250 rpm.

As already explained, technically a primary objective or process condition is to achieve the desired tool path feed rate for as long a period of time as possible and hence to keep the maximum rotational speed as constant as possible, both during the threading, i.e. the first working phase with the working movement VB, and also and especially during the undercut movement, i.e. the second working phase with the deceleration movement AB. This means, in other words, that it is intended that as long a plateau as possible with the maximum rotational speed in the time-dependent function of the rotational speed n(t) is ensured over as long a period of time as possible during the working movement, including the second working phase (undercut movement). The process can thus be operated at the optimal maximum rotational speed for the tool for as long as possible and excessively high forces and accelerations on the tool can be prevented.

It is intended that the maximum rotational speed is, in a further objective or process condition, furthermore also achieved as early as the entry to the workpiece with a predetermined safe distance.

It has now surprisingly been proved that, in the case of the said preferred maximum rotational speeds of 4000 rpm to 6000 rpm, in particular for M6 and M8, it is not possible for a constant maximum rotational speed and hence tool path feed rate to be achieved in the undercut movement, even with this high-end machinery, which caused reduced service life and sometimes even tool failure. The contouring error, i.e. the mismatch between the target value and the actual value of the axis position, becomes larger in machine tools as the rotational speed increases. To be precise, this error can be counteracted by an increase in the Kv factor which specifies the rate at which the contouring error is closed. However, limits are set for increasing the Kv factor because otherwise the control system of the machine becomes unstable, overshoots occur, and the machine begins to vibrate.

In an embodiment, the invention is now based on the idea of interposing or arranging a transmission unit between the spindle of the machine and the tool, which, with a predetermined transmission ratio of at least 1:3, converts the rotational speed of the machine spindle as a drive or drive shaft to a higher rotational speed at the output or of the output shaft with the tool, and hence of the tool itself. The rotational speed at the machine spindle is here the same as the product of the transmission ratio and the rotational speed of the tool. By means of these measures, it was surprisingly possible to obtain a sufficient rotational speed plateau with the maximum rotational speed both during the first working phase (threading) and during the second working phase (producing an undercut or circumferential groove).

The transmission ratio is generally chosen to be between 1:3 and 1:10, in particular between 1:4 and 1:8, preferably between 1:4 and 1:5. It was shown to be the case that higher transmission ratios did not afford any significant further improvements.

If machine-tool control systems should also achieve the said objectives, even without a transmission unit, such explanations also come under the implementation of the invention and hence its protective scope.

Figure 15:
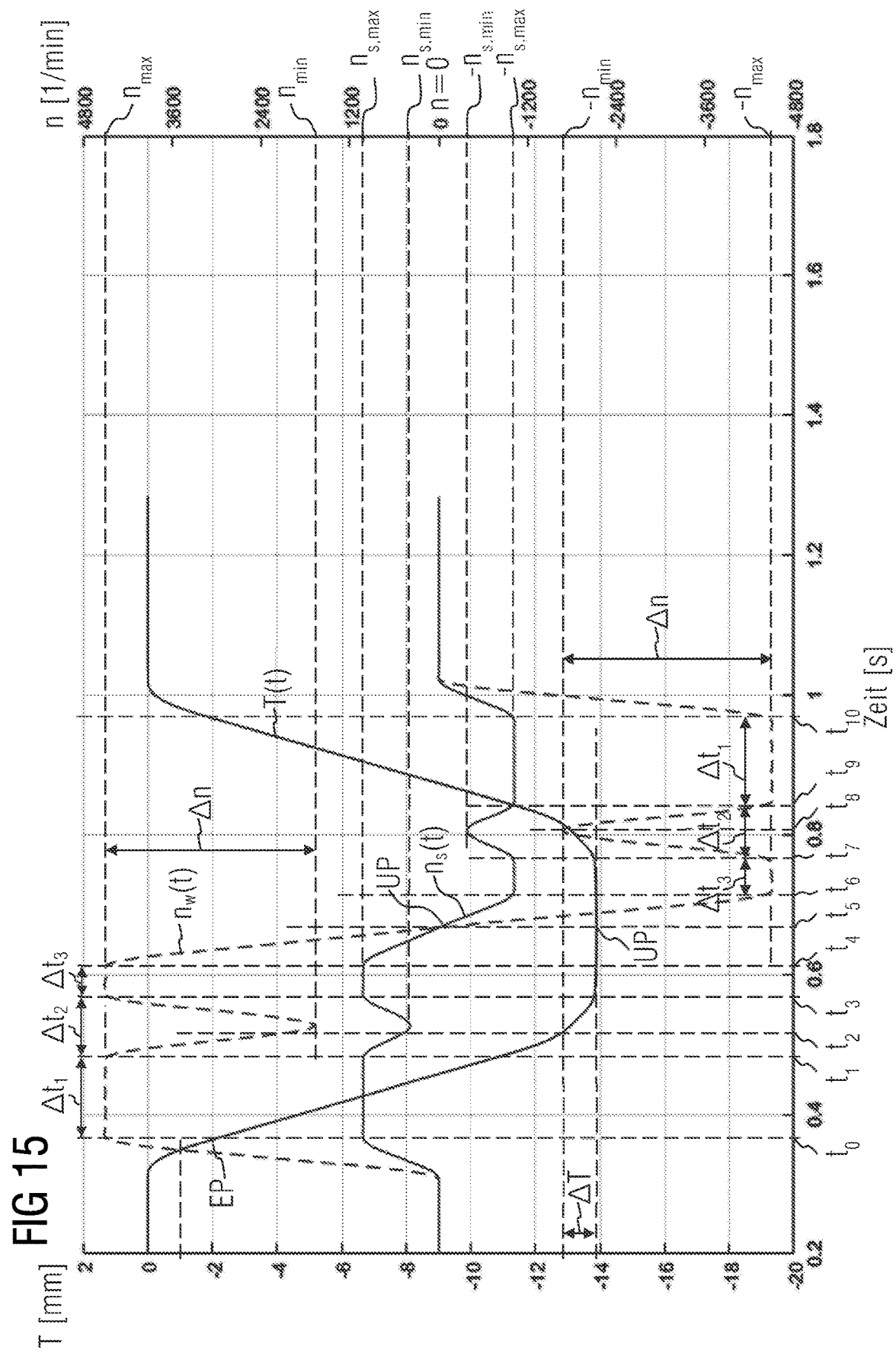
FIG. 15 shows a diagram of the penetration depth and the rotational speed as functions of time with no transmission unit between the drive unit and the tool.
Figure 16:
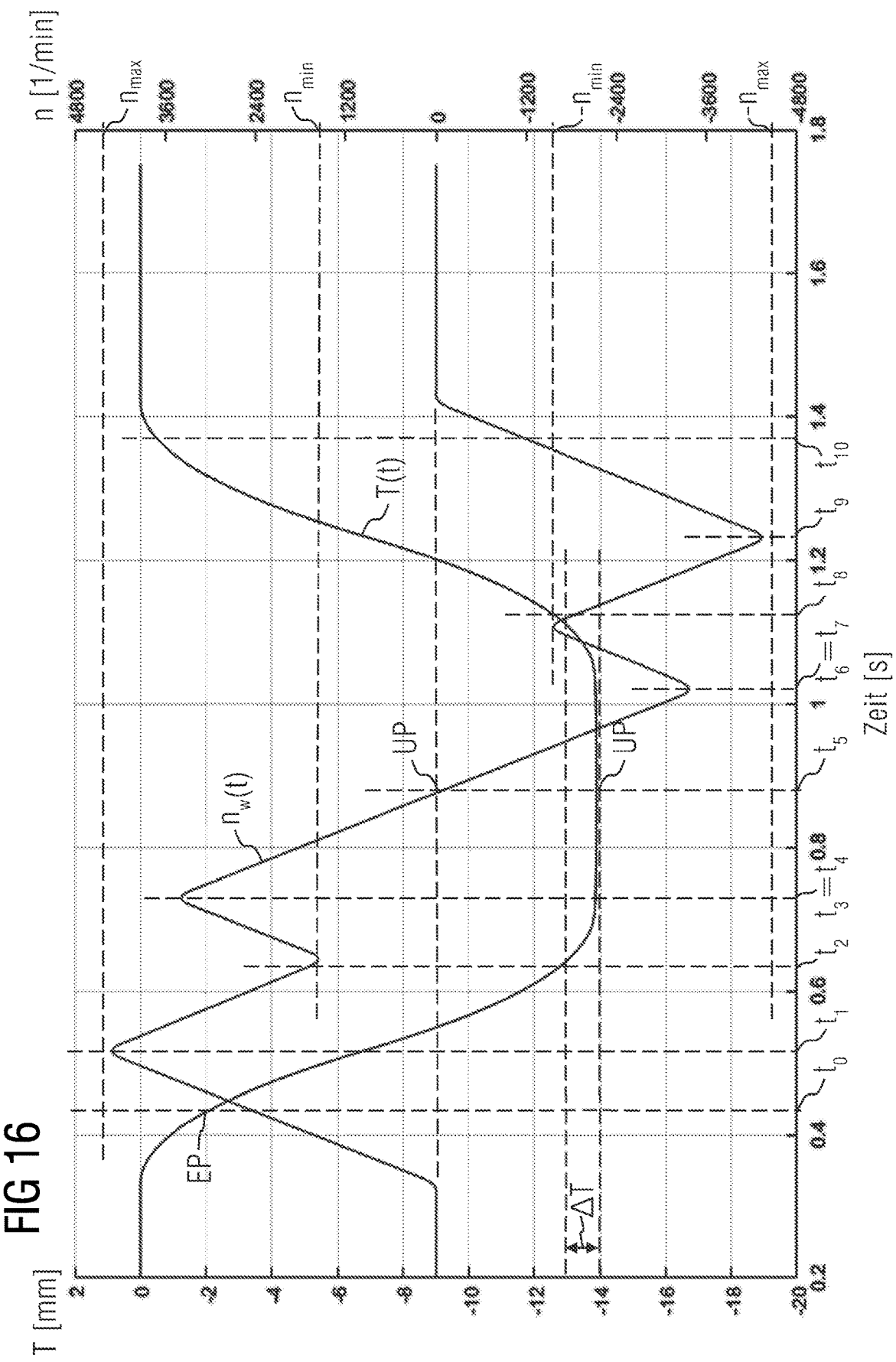
FIG. 16 shows a diagram of the penetration depth and the rotational speed as functions of time with a transmission unit between the drive unit and the tool according to the invention.
Figure 17:
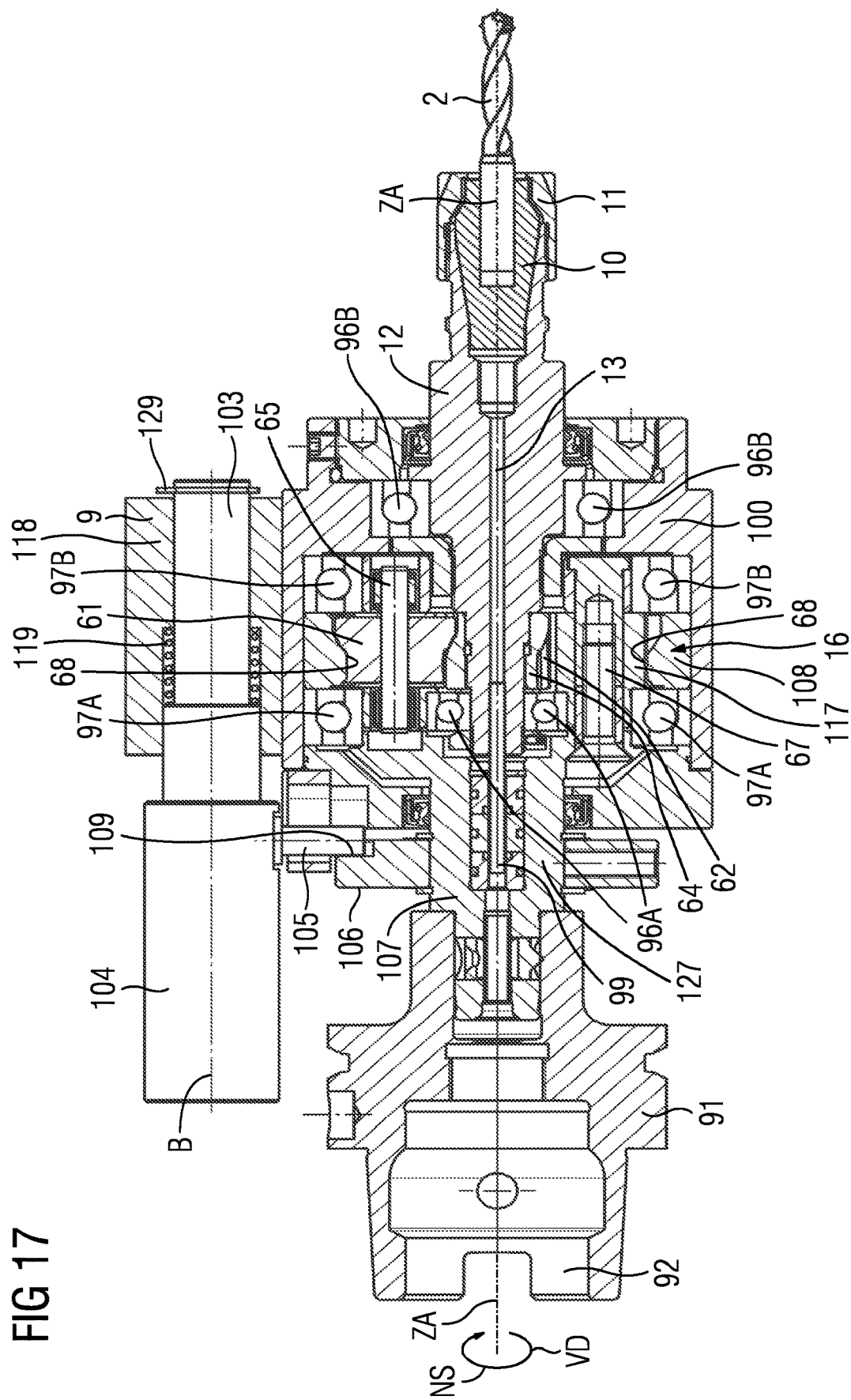
FIG. 17 shows an embodiment of a tool coupling unit with a transmission unit for coupling a combined drilling and threading tool to a drive unit in longitudinal section.

The difference between the presence and absence of a transmission unit is clear from the exemplary embodiments with reference to FIG. 15 and FIG. 16. An exemplary embodiment for the transmission unit used is shown in FIG. 17.

The threading cycle in FIG. 15 has been performed according to the invention with a transmission unit between the machine drive or the machine spindle of the machine tool and the tool. The transmission ratio of the transmission unit, which corresponds to the ratio of the rotational speed of the drive, i.e. in this case the machine drive or the machine spindle, to the rotational speed of the output, i.e. in this case the tool 2 or its tool holder, is here chosen to be less than one, i.e. speed multiplication takes place. In the example illustrated in FIG. 16, a transmission unit with a transmission ratio of approximately 4.4 was chosen with a Speedsynchro® from the Applicant, modified according to the invention, being used. A maximum rotational speed of the spindle of 1020 1/min=17 1/s=17 Hz was set, corresponding to a rotational speed of the tool of 4500 1/min=75 1/s=75 Hz.

The threading cycle in FIG. 16 was performed with no transmission unit between the machine spindle of the machine tool and the tool, i.e. the rotational speed of the spindle corresponded to that of the tool. A maximum rotational speed of the spindle of 4500 1/min=75 1/s=75 Hz was set.

Empirically calculated temporal dependencies or controls of the penetration depth $T=T(t)$ or z-axis coordinates, on the one hand, and the rotational speed $n=n(t)$ as a function of time (t) are illustrated in FIGS. 15 and 16 over the whole threading cycle between the entry point EP and the reversal point UP and back again. The penetration depth $T(t)=T(\varphi(t))$ results as a function of time t by virtue of the chosen dependency $T(\varphi)$ which has already been described in detail. The rotational speed $n(t)$ is correlated with the angular speed $\overline{\omega}=\overline{\omega}(t)=d\varphi/dt$, which corresponds to the first temporal derivative of the angle of rotation $\varphi=\varphi(t)$, as follows: $2\pi n(t)=d\varphi/dt$. The angular speed w or the rotational speed $n(t)$ and the axial speed $v(t)$ are synchronized again, in particular as performed in FIG. 12.

Two different rotational speeds are plotted over time in FIG. 15 as the rotational speed $n(t)$, on the one hand the rotational speed $n_w(t)$ of the tool 2 and, on the other hand, the rotational speed $n_s(t)$ of the machine spindle.

The two rotational speeds $n_w(t)$ and $n_s(t)$ are interlinked via the transmission ratio of the transmission unit, $$I=n_s(t)/n_w(t),$$

i.e. the quotient of the input rotational speed $n_s(t)$ and the output rotational speed $n_w(t)$. The transmission ratio I is generally chosen to be smaller than ⅓ or 1:3 and in the present exemplary embodiment in FIG. 16 the transmission ratio I of the transmission unit is approximately I=1/4.4.

In contrast, just one rotational speed is plotted over time in FIG. 16 as the rotational speed $n(t)$, namely the rotational speed $n_w(t)$ of the tool 2 because, owing to the lack of a transmission unit, the rotational speed $n_w(t)$ of the tool 2 and the rotational speed $n_s(t)$ of the machine spindle are the same, i.e. $n_s(t)=n_w(t)$.

Eleven time points $t_0$ to $t_{10}$ are plotted on the time axis of time t in FIG. 15 and FIG. 16.

Figure 6:
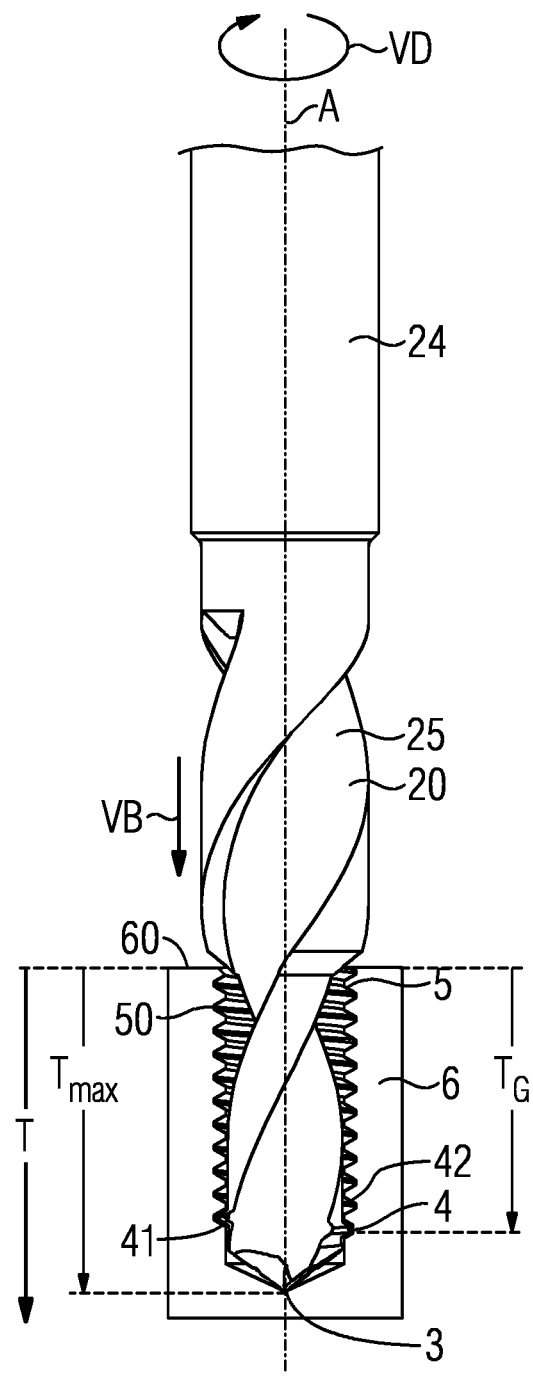

The earliest time point $t_0$ corresponds to the start of the threading cycle at the entry point EP. At $T(t_0)$, the entry point EP is on the workpiece surface and is at a safe distance of here, for example, −2 mm from T=0 mm at which the movement in the z-axis begins. The first working phase of the working movement VB during which the thread is produced begins at the time point $t_0$. The penetration depth $T(t)$ is here synchronized with the angle of rotation $\varphi(t)$ or the rotational speed $n(t)$ over the thread pitch, as shown, for example, in FIG. 12. FIGS. 5 and 6, in which the threading region 4 produces the thread turns 50, belong to this time interval.

At the time point $t_2$, this first working phase ends and transitions to the second working phase of the undercut movement or deceleration movement AB. Here, the thread depth TG, which in the present case is for example approximately 11 mm, is reached at $T(t_2)$.

In the second working phase between the time point $t_2$ and the time point $t_s$, the deceleration movement or undercut movement AB takes place, ending at the reversal point UP. The penetration depth $T(t)$ increases (in amount), becoming considerably slower, by the penetration depth range $\Delta T=T(t_5)-T(t_2)$ to the lowest value $(t_5)$ at the reversal point UP, which is −14 mm in the example illustrated. The tapped hole depth $T_L$ is reached here. Beginning at the time point $t_2$ and as far as the time point $t_5$, which corresponds to the reversal point UP, the deceleration procedure or the undercut movement therefore takes place in order to produce the peripheral groove(s) or undercuts, in particular 53 in FIGS. 1 and 10 and 51 and 52 in FIG. 11, in particular the deceleration movement AB according to FIG. 12 and FIG. 13 and/or the deceleration movement with the predetermined dependency according to the invention between the penetration depth $T=T(\varphi)$ and the angle of rotation $\varphi$ (not to be confused with the curve $T(t)$ in FIGS. 15 and 16). During the deceleration procedure, in the embodiment according to FIG. 12 the penetration depth changes by $\Delta T$ and the angle of rotation by $\Delta\varphi$.

Specifically, a change in the thread pitches $P_i$, with a gap in each case of 0.1 mm, can again be set by the programmed thread commands G331 with a pitch range of 0.9 mm-0.05 mm (the thread itself has P=1 mm). The machine's internal routines here usually interpolate the input commands to form a continuous curve for each axis. By virtue of the reduced pitches in the undercut movement, the chip root in the bottom of the bore is in particular decreased until it is no longer an obstacle during the backward movement.

At the reversal point UP, the penetration depth $T(t)$ reaches its lowest and biggest (in terms of amount) value $T_L$ and the angle of rotation $\varphi(t)$ likewise reaches its largest or widest value $\varphi_L$. The axial speed $v(t)=dT/dt$ and the rotational speed $n(t)=d\varphi/dt/2\pi$ each temporarily assume a zero value at the reversal point UP, i.e. the tool 2 here temporarily comes to a halt, as illustrated for example in FIG. 7.

Beyond the reversal point UP at the time point $t_5$, the reversing movement RB of the tool 2 begins which is again split into a first reversing phase with the acceleration movement BB, which is between the time points $t_5$ and $t_8$, and a second reversing phase which is between the time points $t_8$ and $t_{10}$. The workpiece surface is reached again at the time point $t_{10}$ and $T(t_{10})=T(t_0)$, and in the present example is −2 mm. In the exemplary embodiments illustrated in FIGS. 15 and 16, with no limitation of the general nature of the invention, the controlling of the feed movement VB and the reversing movement RB is configured essentially symmetrically with respect to the reversal point UP, i.e. the graphs for the penetration depth $T=T(t)$ are essentially axially or mirror symmetrical with respect to a perpendicular axis of symmetry extending through the time point $t_s$ of the reversal point UP, and the graphs of the rotational speeds $n_w(t)$ and $n_s(t)$ each essentially point symmetrical with respect to the point $(t_5, 0)$ at the reversal point UP.

In the exemplary embodiments in FIGS. 15 and 16, the dependency or synchronization of the penetration depth $T=T(\varphi)$ on or with the angle of rotation $\varphi$ is chosen with a varying thread pitch parameter in the undercut movement AB according to FIGS. 12, 13, and 14.

As can be immediately seen in FIGS. 15 and 16, despite the resulting maximum rotational speed $n_{max}$ at the tool which is programmed in the machine control system theoretically being the same, in this case 4500 rpm, the actual curves of the rotational speed $n_w(t)$ over time differ quite considerably. This is explained in detail below.

In the embodiment according to the invention with a transmission unit according to FIG. 15, the machine control system increases the rotational speed $n_w(t)$ according to the predetermined maximum rotational acceleration beyond the time point at T=0 mm and, shortly before the time point t0 at the entry point EP, reaches the maximum value $n_{s,max}$ of the rotational speed of the machine spindle and the corresponding multiplied maximum value of the rotational speed of the tool. This maximum value of the rotational speed of the tool then reaches or then corresponds to the theoretical, programmed maximum rotational speed $n_{max}$ of the tool, here the full 4500 rpm, and correspondingly $n_{s,max}$=I $n_{max}$=1020 rpm for the spindle.

This maximum rotational speed $n_{max}$ is then held constant over a plateau with a time interval $\Delta t_i$ between the time points $t_0$ and $t_1$, i.e. $n_w(t)=n_{max}$ or correspondingly $n_s(t)=n_{s,max}$ in the time interval between $t_0$ and $t_1$ of the interval length $\Delta t_1$.

At the time point $t_4$, the rotational speed $n_w(t)$ decreases again as far as a local minimum at a minimum rotational speed $n_{min}$, which minimum and which rotational speed are within the deceleration movement AB, i.e. here shortly after the time point $t_2$.

The difference in rotational speed between the maximum rotational speed $n_{max}$ and the minimum rotational speed $n_{min}$ is designated by $\Delta n$, i.e. $\Delta n=n_{max}-n_{min}$, and should not exceed 0.8 $n_{max}$. $\Delta n$ is dependent on the machine and machine control system used.

After the minimum rotational speed $n_{min}$ has been reached as a consequence of controlling the undercut movement AB, the rotational speed $n_w(t)$ then immediately rises again and for the second time again reaches the maximum rotational speed $n_{max}$ at the time point $t_3$, which is kept constant over a second plateau with a time interval $\Delta t_3$ between the time points $t_3$ and $t_4$, i.e. $n_w(t)=n_{max}$ or correspondingly $n_s(t)=n_{s,max}$ in the time interval between $t_3$ and $t_4$ of the interval length $\Delta t_3$.

The time curve of the rotational speed $n_w(t)$ is qualitatively the same in the case of other values for the transmission ratio I, in particular within a value range of I=3 to 8, and in the case of other values for the maximum rotational speed $n_{max}$, in particular within a value range of 3000 to 10,000 rpm, even in the different combinations. In particular, the two plateaus $\Delta t_i$ and $\Delta t_3$ with the intermediate time interval $\Delta t_2$ are also present.

The absolute values of the interval length of the second plateau $\Delta t_3$ depend on the transmission ratio I and the maximum rotational speed $n_{max}$ and also on the machine control system. In particular, the interval length $\Delta t_3$ of the second plateau can be chosen within a range of 0.01 s to 0.25 s, in particular 0.02 s to 0.13 s.

Beyond the time point $t_4$, the rotational speed $n_w(t)$ decreases to 0 at the reversal point UP at the time point $t_5$.

The intermediate time interval $\Delta t_2$ between the time points $t_1$ and $t_3$, which is situated between the two plateaus, i.e. the durations $\Delta t_i$ and $\Delta t_3$ with the maximum rotational speed $n_{max}$, also depends on the machine and in general does not need to be prevented but should be minimized.

The absolute values for the interval length of the intermediate time interval $\Delta t_2$ for the different transmission ratios I and maximum rotational speeds $n_{max}$ are situated in particular between 0.05 s and 0.15 s, preferably between 0.06 and 0.10 s, and therefore usually do not vary as much as at $\Delta t_3$.

Also interesting here, inter alia, is the ratio $\Delta t_2/\Delta t_3$ of the time interval $\Delta t_2$ between the plateaus and the time interval of the second plateau $\Delta t_3$ because the time interval $\Delta t_2$ of the first plateau also depends on the thread length. The ratio $\Delta t_2/\Delta t_3$ is generally situated within a range of 0.3 to 3.4 for the different transmission ratios I and maximum rotational speeds $n_{max}$, in particular within a range of 0.5 to 2.4.

This curve of the rotational $n_w(t)$ speed during the working movement between the time points $t_1$ and $t_5$ is repeated, as can be seen in FIG. 15, in the reversing movement between the time points $t_5$ and $t_{10}$ point symmetrically at the reversal point UP with two plateaus of the maximum rotational speed–$n_{max}$, namely the plateau $\Delta t_3$ between the time points $t_6$ and $t_7$ and the plateau $\Delta t_i$ between the time points $t_9$ and $t_{10}$ and the intermediate region of a lower rotational speed with the minimum rotational speed–$n_{min}$ between the time points $t_7$ and $t_9$.

In the embodiment with no transmission unit according to FIG. 16, the machine control system increases the rotational speed $n_w(t)$ according to the predetermined maximum rotational acceleration from the time point at T=0 over the time point to at the entry point EP up to the time point $t_1$, until a punctual local and global maximum is reached at this time point $t_1$, but with no plateau, i.e. with no time interval in which the rotational speed remains at its maximum value. Instead, the maximum value of the rotational speed $n_w(t)$ is left again immediately, i.e. the rotational speed $n_w(t)$ decreases again at once beyond the time point $t_1$. Moreover, the maximum value of the rotational speed $n_w(t)$ which is actually achieved is situated below the programmed maximum rotational speed $n_{max}$.

At the time point $t_3$, the rotational speed $n_w(t)$ reaches a local minimum $n_{min}$ which is already situated within the deceleration movement AB, i.e. in this case shortly after the time point $t_2$. The rotational speed $n_w(t)$ then rises again as a result of the controlling of the undercut movement AB and reaches a second local maximum at the time point $t_4$ and then decreases as far as 0 only at the reversal point UP and the time point $t_5$. The maximum at this time point $t_4$ is smaller than the maximum at the time point $t_1$ and is punctual, i.e. here too, no plateau with a constant rotational speed is formed.

This curve of the rotational speed $n_w(t)$ during the working movement between the time points $t_1$ and $t_5$ is repeated in the reversing movement between the time points $t_5$ and $t_{10}$ point symmetrically at the reversal point UP with two maximum amounts at the time points $t_6$ and $t_9$ and an intermediate minimum amount–$n_{min}$ at the time point $t_8$. The maximum rotational speed–$n_{max}$ is not achieved in the reversing movement either and the desired plateaus of the rotational speed are not formed.

The flank slopes or pitches at the rotational speed are limited or determined in both exemplary embodiments and in general by the maximum rotational acceleration of the machine spindle.

In embodiments with the transmission unit such as that according to FIG. 15, improvements in the thread quality, machine wear, tool stress, and consequently presumably also the tool service life, were found compared with embodiments with no transmission unit such as that according to FIG. 16.

A tool coupling device is now shown in a first embodiment according to the invention in FIG. 17. The exemplary embodiment illustrated is produced by modifying the Speed-synchro® chuck from the Applicant or the chuck disclosed, for example, in EP 2 361 712 A1. In contrast to the known chuck, a rigid coupling with no length compensation by means of elastomers is produced so as not to compromise the accuracy of the control steps performed in the vicinity of the reversal point UP.

The tool coupling device is provided for coupling a tool 2 to a drive unit, in particular to a machine spindle of a machine tool, and comprises an output shaft 12, a housing 100, a drive shaft 107, and an adapter 91 which can be coupled to a machine spindle (not illustrated) or a (rotational) drive unit, and a transmission unit 16 between the drive shaft 107 and the output shaft 12.

The tool 2 is held in a collet 10 which is in turn held in a holder, formed on one side, of an output shaft (or a chuck head) 12. In order to hold the tool 2, the collet 10 is compressed or tensioned inward by means of a clamping nut 11 screwed onto a thread of the output shaft 12. A different holding means, for example a quick-change insert or shrink-fit chuck, can of course also be provided instead of a collet.

The output shaft 12 extends from the holder for the collet 10 as a continuous or integral body further through an opening of the housing 100 into the housing 100 as far as the interior of an approximately annular holding region 117, arranged inside the housing 100, of the drive shaft 107. Other than the holding region 117, the drive shaft 107 comprises a hollow shank 127 which widens toward the holding region 117 and is detachably connected thereto, for example via connecting screws, one of which, with the reference number 67, can be seen. The adapter 91, which has a holding space 92 for holding and coupling the machine spindle (not illustrated) of a machine tool (or drive unit), is detachably fastened at the end of the hollow shank 127 of the output shaft 12. The adapter 91 can be adapted to different forms of machine spindle. By means of this modular system with a replaceable adapter 91, the coupling device can be coupled to different machine spindles using different adapters. The two openings in the housing 100 are closed by closures (not described in detail) with seals around the drive shaft 12 and output shaft 107.

The output shaft 12, together with the tool 2 held non-rotatably thereon via the collet 10, and also the drive shaft 107 with the adapter 91 can each be rotated about a center axis ZA in a forward direction of rotation VD (or in a backward direction of rotation which is not illustrated). The machine spindle and hence the adapter 91 coupled thereto non-rotatably and the drive shaft 107 with the holding region 117 then each rotate at the input rotational speed or machine rotational speed ns of the machine spindle, and the output shaft 12, together with the tool 2 held non-rotatably thereon via the collet 10, rotates respectively at the output rotational speed or tool rotational speed n, about the center axis ZA.

A transmission unit 16, which is arranged inside the housing 100, is then interposed between the drive shaft 107 and the output shaft 12. The transmission unit 16 converts, with the same direction of rotation, the machine rotational speed ns into the tool rotational speed n, according to the transmission ratio I of the transmission unit 16. In the exemplary embodiment illustrated in FIG. 17, the transmission unit 16 is designed with a gear, in particular a planetary gear. The gear of the transmission unit 16 comprises a central gear wheel 64, an outer ring gear 108 on the housing 100 with an internal toothing 68, and intermediate gear wheels, for example three of them, two of which gear wheels 61 and 62 can be seen in FIG. 17, which are arranged between the gear wheel 64 and the internal toothing 68 and engage respectively with their external toothings in the external toothing of the inner gear wheel 64 and in the internal toothing 68. The central gear wheel 64 is arranged in a central region of the housing 100 and connected non-rotatably to the output shaft 12. The gear wheels 61 and 62 are mounted rotatably on the holding region 117 of the drive shaft 107 via assigned axle bolts, only the axle bolt 65 of which, for the gear wheel 61, can be seen. The toothings in the gear determine the transmission ratio I. It is, however, also possible for a different gear to be provided for the transmission unit 16 instead of such a planetary gear, for example a friction gear or other toothed gear systems.

The output shaft 12 thus extends through the gear of the transmission unit 16, preferably as an integral rigid body, and is then rotatably mounted on both sides in each case via rolling bearings, in particular ball bearings, namely via rolling bearings 96B on the side facing the tool 2 against or inside the housing 100 and on the other side facing the adapter 91 via rolling bearings 96A against or inside the drive shaft 107. A very rigid and stable structure with excellent concentricity properties that are advantageous for the process according to the invention is obtained as a result. The drive shaft 107 is rotatably mounted, preferably in its holding region 117, on both sides and relatively close to the gear of the transmission unit 16 in each case by means of further rolling bearings 97A on the side facing the adapter 91 and rolling bearings 97B on the side facing the tool 2 or inside the housing 100.

In order to absorb the torque created by the gear of the transmission unit 16 because of the action and reaction, the anti-rotation unit 9 illustrated at the top in FIG. 17 and rigidly connected to the housing 100 is provided as a torque-absorbing means or an anti-torque means. The anti-rotation means 9 comprises, in an axial arrangement along an axis B parallel to the center axis ZA, a fixing bolt 103 which is guided in a guide part 118, and a connection part 104 for connection to a stationary non-corotating reference system, for example a machine frame or machine housing. In the non-connected state illustrated, the connection part 104 is pressed forward along the axis B by a spring 119 which is supported on the guide part 118 connected to the housing 100. A locking element 105 consequently latches into a locking socket (locking groove) 109 in an outer ring 106 on the outside of the hollow shank 127 on the drive shaft 107. A snap ring 129 at the end of the guide part 118 forms a securing means against the spring force of the spring 119. In the connected state not illustrated, in contrast, the connection part 104 is pressed backward against the spring 119 along the axis B and moves the locking element 105 out of the locking socket 109 and as a result the unit is ready for operation.

An inner coolant and/or lubricant feed system is moreover present which extends along the center axis ZA from the adapter 91 through a transfer tube 99 into an inner duct 13 in the output shaft as far as the tool 2.

The embodiments of the tool coupling device according to the invention are preferably provided for a tool according to the invention and a method according to the invention but can also be used independently thereof for a different rotating tool or method.

Figure 19:
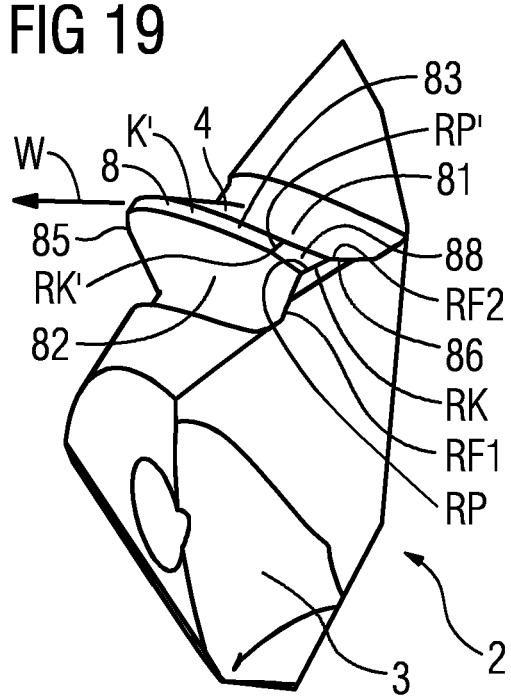
FIG. 19 shows the tapping and chip-removal tooth from FIG. 18 in a perspective view from behind.

FIGS. 18 and 19 show exemplary embodiments of a tapping and chip-removal tooth 8 which can be used as the last or rearmost tapping tooth in the tool 2 according to the invention.

The tapping and chip-removal tooth 8 is provided in a first or main function for the complete production or finalization or finishing of the thread turns or the tapping profile of the thread turns. For this purpose, the tapping and chip-removal tooth 8 comprises, on its front region arranged at the front when viewed in the feed direction or forward direction or the direction of the handedness W, a thread cutter 85 with a tapping tooth profile GP which has a tapping tooth profile head K, a front tapping tooth profile flank F1, and a rear tapping tooth profile flank F2. In the exemplary embodiment illustrated, the tapping tooth profile GP is trapezoidal. However, any and in particular all the known tapping profiles can be represented and produced with the tool in all embodiments. In embodiments, the whole tapping tooth profile GP is produced by cutting and therefore the thread cutter 85 reproduces the whole tapping profile. In an embodiment which is not illustrated, the tapping and chip-removal tooth 8 can also work exclusively by forming and not removing material, solely by means of at least one furrowing element, when producing the thread.

In embodiments, for example as shown in FIG. 18, a usually lower part of the tapping profile GP is produced by cutting and the thread cutter 85 therefore reproduces this part of the tapping profile and the remainder of the tapping profile is produced without removing material by impression or cold forming. For this purpose, in such embodiments, the tapping and chip-removal tooth 8 comprises, behind the thread cutter 85 on the rear of the tooth, a furrowing region which increases outward starting from the thread cutter 85, for example in the form of an in particular flat furrowing surface 84 which rises with a furrowing slope to a tooth ridge 83 which is in particular flat or is situated on a cylindrical surface. This tooth ridge 83 forms a calibrating region for this thread furrowing region and preferably forms the final tapping tooth profile head K' or reproduces the final thread bottom of the thread turns in the workpiece. The width of the tapping tooth profile head K' of the tooth ridge 83 is smaller than that of the tapping tooth profile head K of the thread cutter 85, and the tapping tooth profile flanks F1 and F2 continue over the initial furrowing surface as far as the tapping tooth profile head K'. The resulting tapping tooth profile GP' is obtained at the end of the thread furrowing surface 84 or at the transition region between the thread furrowing surface 84 and the tooth ridge 83.

In each case, a tapping tooth element which reproduces the tapping tooth profile GP is provided in the front region of the tapping and chip-removal tooth 8, either just by a thread cutter 85, by a combination of a thread cutter 85 and a thread furrowing surface 84, or alternatively just by a furrowing element.

The tapping and chip-removal tooth 8 is moreover also provided in a second function as a chip-removal tooth or for the purpose of removing chips or chip roots or other residues situated in the already produced thread turns or alternatively the circumferential groove during the backward movement RB in the second reversing phase and also in the first reversing phase. For this purpose, the tapping and chip-removal tooth 8 has, at its rear region arranged behind when viewed in the feed direction or forward direction VB or in the direction of the handedness W, a chip-removal cutter 86 with a chip-removal profile RP which has a chip-removal profile head RK, a front chip-removal profile flank RF1, and a rear chip-removal profile flank RF2. The chip-removal profile RP can in particular correspond to the tapping tooth profile GP or be identical or at least similar to it. The foreign bodies, in particular chips or chip roots, situated in the thread turns or in the circumferential groove are separated or severed by the chip-removal cutter 86.

The chip-removal function is supplementarily fulfilled, for example according to FIG. 19, by a chip-removal face 88 which rises from the chip-removal cutter 86 from its chip-removal profile head RK to the tooth ridge 83 in a similar fashion to the initial furrowing surface 74 which rises from the thread cutter 75 to the tooth ridge 83 as far as the chip-removal profile RP' with the chip-removal profile head RK'. The chip-removal face 88 presses remaining residues of chip roots or the like into the workpiece surface and/or smooths the workpiece surface, in particular in the thread turns, and can also serve to stabilize the tool when it is moved.

The chip-removal cutter 86 on its own or in combination with the chip-removal face 88 forms or form a chip-removal element on the rear or in the rear region of the tapping and chip-removal tooth 8, i.e. the region which forms the region which occurs first in the thread turns during the reversing movement. The chip-removal element 86 or 86 and 88 forms, as a common active profile, a chip-removal profile RP which preferably corresponds to the tapping profile of the thread produced such that no gaps occur during the chip-removal procedure.

The tooth flanks 81 and 82 of the tapping and chip-removal tooth 8 are then in particular configured, in particular ground with a grinding wheel, such that they run at least predominantly or completely over their whole length along the associated front tapping tooth flank envelope G1 and rear tapping teeth flank envelope G2 or with no relieved surfaces or relief angles.

The tooth ridge 83 also preferably does not have any relieved surfaces. Consequently, during the reversing or backward movement, the tapping and chip-removal tooth 8 runs with no gap through the thread turns produced and the chip-removal function is optimized because no chips or residues can get stuck in such a gap and residues such as chip roots on the workpiece surface can be impressed completely into the latter.

The design of the tapping and chip-removal tooth 8 with a full tapping tooth profile and full chip-removal profile also makes it possible to separate the two functions such that the chip-removal element, as far as possible, does not work during the forward movement. The shaping chamfers on the front and rear side, i.e. the furrowing surface 84 and the chip-removal face 88, also stabilize the cutter corners and the cutter edge against breaking when chips get stuck and also against fracturing with respect to the pressure on the rear flank which is created in the deceleration range by the smaller programmed feed in the z direction. In principle, a full profile with no relieved surfaces just in some sections is also sufficient for such "complete" chip removal and nevertheless relieved surfaces or clearances can be provided in some sections on the tooth flanks 81 and 82 in order to reduce the friction of the tapping and chip-removal tooth 8.

In the case of the tool according to FIG. 1 with two tapping teeth 41 and 42, the tapping and chip-removal tooth 8 is preferably used as the rear tapping tooth 42.

In the case of the tool 2 with such a tapping and chip-removal tooth, it was found that the latter presses during the deceleration and consequently reduces the drilling force. By virtue of the transmission unit, in particular the modified SpeedSynchro, in combination with the process according to the invention, this force of the chip-removal tooth, which disadvantageously counteracts the drilling force, is reduced.

In contrast, it is intended that the front tapping tooth 41 of the tool 2, in particular according to FIG. 1, or generally a tapping tooth situated further forward, generates as little friction as possible, preferably also during the undercut movement, and is therefore preferably set apart in two directions. The front tapping tooth, in particular 41, can thus be set apart or offset backward with its front flank relieved surface relative to a front tapping tooth flank envelope which extends along or parallel to the helical line and through a front tapping tooth profile flank, and with its rear flank relieved surface relative to a rear transverse plane which is oriented perpendicular to the tool axis A and extends through the rearmost point of the rear tapping tooth profile flank and is inclined, offset forward, or set apart with respect to the helical line of the thread by the thread pitch angle. As a result, the front tapping tooth 41 does not rub with its flank regions against the workpiece surface during the undercut movement too.

Although the measures according to the invention have mostly been described in conjunction with a combined tool with a drilling region, they are also advantageous for a process with an undercut movement using a simple threading tool with no drilling region, in which the threading region produces a circumferential groove or an undercut.

LIST OF REFERENCE SYMBOLS 2 tool
3 drilling region
4 threading region
5 tapped hole
6 workpiece
8 tapping and chip-removal tooth
9 anti-rotation unit
10 collet
11 clamping nut
12 output shaft (or chuck head)
13 inner duct
16 transmission unit
20 working region
21 tool shank
25 separating grooves
31, 32 (main) drilling cutter
33 drill tip
41, 42 tapping/threading tooth
50 thread turns
51, 52, 53 peripheral groove
55 tapping profile
56 drilling subregion
60 workpiece surface
61, 62, 63, 64 gear wheel
65 axle bolt
67 connecting screw
68 internal toothing
74 initial furrowing surface
75 thread cutter
81, 82 tooth flank
83 tooth ridge
84 thread furrowing surface
85 thread cutter
86 chip-removal cutter
88 chip-removal face
90 machine rotor (or drive shaft, shank)
91 adapter
92 holding space
96A, 97A bearing
97A, 97B bearing
99 transfer tube
100 housing
101 side housing
102 hood
103 fixing bolt
104 connection part
105 locking element
106 outer element
107 drive shaft
108 ring gear
109 locking socket
111 stop face
112 projection
113 stop face
117 holding region
118 guide part
119 spring
127 hollow shank
129 snap ring
$\varphi$ angle of rotation
$\varphi_G$ angle of rotation range
$\varphi_L$ maximum angle of rotation range
$\Delta T$ penetration depth range/maximum penetration depth
a groove length
A tool axis
AB deceleration movement
b thread gap
B axis
BB acceleration movement
c thread width/tapping profile width of the active tapping profile
D thread external diameter
d core hole diameter
d' external diameter
EP entry point
F1, F2 tapping tooth profile flank
GP, GP' tapping tooth profile
K, K' tapping tooth profile head
M thread center axis
n rotational speed
$n_{max}$ maximum rotational speed
$n_s$ rotational speed of spindle
$n_w$ rotational speed of tool
P thread pitch
$P_1$ to $P_{10}$ pitch parameters/pitch values
RB reversing/backward movement
RD backward direction of rotation
RF1, RF2 chip-removal profile flank
RK, RK' chip-removal profile head
RP, RP' chip-removal profile
$S_i$, $S_1$ to $S_{10}$ deceleration steps
T penetration depth/axial feed
$T_G$ thread depth/thread length
$T_L$ total depth/hole depth/axial dimension of the tapped hole
$T_{max}$ maximum penetration depth
UP reversal point
VB forward movement
VD forward direction of rotation
W handedness
ZA center axis

We claim:

1. A method for producing a thread with a predetermined thread pitch in a workpiece, wherein:
   a) a tool is used to produce the thread,
   a1) the tool comprises at least one threading region, a2) the threading region runs around a tool axis extending through the tool with the predetermined thread pitch and a predetermined handedness of the thread to be produced,
b) the tool is moved into the workpiece in a working movement during a first working phase,
b1) the working movement of the tool comprises a rotational movement with a predetermined direction of rotation about the tool axis and further comprises an axial feed movement of the tool, in an axial forward direction axially with respect to the tool axis, the axial feed movement of the tool being synchronized with the rotational movement in accordance with the thread pitch of the threading region, in such a way that one complete revolution of the tool about the tool axis corresponds to an axial feed of the tool by the predetermined thread pitch,
b2) the threading region produces thread turns, running at the predetermined thread pitch, in the workpiece during the first working phase,
c) the tool is moved further into the workpiece as far as a reversal point in a deceleration movement during a second working phase following the first working phase,
c1) the axial feed of the tool, relative to one complete revolution at least during a part of the deceleration movement and, is smaller in amount than the thread pitch and is zero at the reversal point, and
c2) the threading region of the tool produces at least one peripheral groove in the workpiece during the deceleration movement,
d) during the working movement, a rotational speed of the rotational movement of the tool over time extends over a first plateau during which the rotational speed remains constant at a predetermined maximum rotational speed ($n_{max}$), and
e) during the deceleration movement, an actual rotational speed of the rotational movement of the tool over time extends over a second plateau during which the rotational speed remains constant at the same predetermined maximum rotational speed ($n_{max}$), and
f) the predetermined maximum rotational speed of the rotational movement of the tool is chosen to be at least large enough that a tool path feed rate at the threading region of at least 57 m/min is obtained, which for a thread diameter of 6 mm corresponds to a maximum rotational speed of at least 3000 rpm.

2. The method as claimed in claim 1, wherein an intermediate time interval ($\Delta t_2$), in which the rotational speed falls below the maximum rotational speed, is situated between a time interval ($\Delta t_1$) of the first plateau and a time interval ($\Delta t_3$) of the second plateau.

3. The method as claimed in claim 2, wherein a ratio ($\Delta t_2/\Delta t_3$) between an interval length of the intermediate time interval ($\Delta t_2$) and an interval length of the time interval ($\Delta t_3$) of the second plateau is situated within a range from 0.5 to 2.4.

4. The method as claimed in claim 2, wherein:
an interval length of the second plateau ($\Delta t_3$) is chosen to be within a range from 0.01 s to 0.25 s, and/or
the interval length of the intermediate time interval ($\Delta t_2$) is chosen to be between 0.05 s and 0.15 s.

5. The method as claimed in claim 1, wherein a maximum tool path feed rate achieved at the threading region is situated within a range from 57 m/min to 189 m/min.

6. The method as claimed in claim 1, wherein the maximum rotational speed is already reached at the beginning of the first working phase or of the working movement or at the entry point of the tool into the workpiece.

7. The method as claimed in claim 1, wherein
a) the tool is driven by a machine drive in the working movement and in the deceleration movement and by a transmission unit for the rotational movement,
b) the transmission ratio corresponds to the quotient of a rotational speed of the machine drive and the rotational speed of the tool and is a maximum of 1:3, and
c) a maximum rotational speed of the rotational movement of the machine drive, which corresponds to the product of the transmission ratio and the predetermined maximum rotational speed of the rotational movement at the tool, is programmed in a program for the machine drive.

8. The method as claimed in claim 7, wherein the transmission ratio is chosen to be between 1:3 and 1:10.

9. The method as claimed in claim 1, wherein:
the threading region has an active profile which corresponds to a tapping profile of the thread to be produced, and/or
the threading region has at least one tapping tooth, wherein the or at least one tapping tooth produces at least one circumferential or peripheral groove in the workpiece during the deceleration movement.

10. The method as claimed in claim 1, wherein:
during at least a majority of the second working phase or during a whole second working phase, the tool is moved in the same forward direction as during the working movement in the first working phase and/or
the deceleration movement comprises a rotational movement with the same direction of rotation as in the working movement.

11. The method as claimed in claim 1, wherein:
the rotational speed of the rotational movement is zero at the reversal point and/or
a whole or cumulative axial feed of the tool during the deceleration movement is chosen to be between 0.1 and 2 times the thread pitch.

12. The method as claimed in claim 1, wherein, during the deceleration movement the axial feed movement is controlled depending on an angle of rotation of the rotational movement of the tool according to a previously stored injective correlation between the axial feed movement of the tool and the angle of rotation.

13. The method as claimed in claim 1, wherein, during the deceleration movement, in a plurality of successive deceleration steps different correlations between the axial feed of the tool and an angle of rotation are chosen or set.

14. The method as claimed in claim 13, wherein, during the plurality of successive deceleration steps a linear function of the angle of rotation is chosen for an axial penetration depth or the axial feed and/or in which a pitch, the derivative of the axial penetration depth or the axial feed with respect to the angle of rotation, is set to be constant in each of these deceleration steps and to decrease in amount from one deceleration step to a subsequent deceleration step.

15. The method as claimed in claim 14, wherein a NC command for a threading process is used with the thread pitch of the thread and, in the plurality of successive deceleration steps, a NC command for a threading process, is likewise used with a respective constant pitch as a thread pitch parameter.

16. The method as claimed in claim 13, wherein:
during the plurality of successive deceleration steps, an axial penetration depth or the axial feed is a spline function of the angle of rotation; and/or different functions of successive deceleration steps are continuous and, in the case of differentiable functions joined together in a continuously differentiable manner.

17. The method as claimed in claim 1, wherein the axial feed is zero during an acceleration movement in a subinterval of an angle of rotation and/or takes place in a subinterval of an angle of rotation in a backward direction in an opposite direction to the axial forward direction of the working movement.

18. The method as claimed in claim 1, wherein after the reversal point has been reached, a reversing movement of the tool is initiated by means of which the tool is moved out of the workpiece, wherein the reversing movement comprises:

initially a first reversing phase by means of which the threading region of the tool is guided back into the thread turns of the thread produced, and then a second reversing phase during which the threading region is guided outward through the thread turns out of the workpiece, the reversing movement is performed with a movement path, which is symmetrical with respect to the working movement and the deceleration movement, with an opposite direction of rotation and an opposite feed, and/or the reversing movement in the first reversing phase is controlled with a previously stored injective correlation, of the same amount, but inverted in the direction of rotation and the direction of feed between the axial feed of the tool and an angle of rotation, as in the deceleration movement during the second working phase where present.

19. The method as claimed in claim 18, wherein, during the reversing movement, a tapping and chip-removal tooth removes foreign bodies from the thread and can also smooth the workpiece surface and/or not allow any gaps from an inner wall of the thread turns to occur during the chip-removal procedure.

20. The method as claimed in claim 1, wherein:
a) the tool moreover comprises a drilling region, and
b) wherein, during the working movement in the first working phase, the drilling region of the tool produces a core hole in the workpiece and the threading region produces the thread turns, running with the predetermined thread pitch, in an inner wall of the core hole produced by the drilling region, wherein the drilling region and the threading region are rigidly coupled to each other in terms of movement and execute the working movement together without changing their relative position to each other, and/or wherein the drilling region is arranged in a region which is situated further forward than the threading region, and/or the threading region projects further outward radially with respect to the tool axis than the drilling region.

* * * * *